US012777105B2

(12) United States Patent
Carranza et al.

(10) Patent No.: US 12,777,105 B2
(45) Date of Patent: Oct. 27, 2026

(54) SERVICE MESH SWITCHING

(71) Applicant: Intel Products IP LLC, Santa Clara, CA (US)

(72) Inventors: Marcos E. Carranza, Portland, OR (US); Francesc Guim Bernat, Barcelona (ES); Kshitij Arun Doshi, Tempe, AZ (US); Karthik Kumar, Chandler, AZ (US); Srikathyayani Srikanteswara, Portland, OR (US); Mateo Guzman, Beaverton, OR (US)

(73) Assignee: Intel Products IP LLC, Santa Clara, CA (US)

( * ) Notice: Subject to any disclaimer, the term of this patent is extended or adjusted under 35 U.S.C. 154(b) by 0 days.

(21) Appl. No.: 18/090,813

(22) Filed: Dec. 29, 2022

(65) Prior Publication Data

US 2023/0135938 A1 May 4, 2023

Related U.S. Application Data

(60) Provisional application No. 63/425,857, filed on Nov. 16, 2022.

(51) Int. Cl.
*H04L 67/63* (2022.01)
*G06F 9/30* (2018.01)
(Continued)

(52) U.S. Cl.
CPC ............ *H04L 67/63* (2022.05); *G06F 9/3005* (2013.01); *G06F 9/3885* (2013.01); *G06F 9/4881* (2013.01); *G06F 9/5038* (2013.01); *G06F 9/505* (2013.01); *G06F 9/5072* (2013.01); *G06F 9/5077* (2013.01); *G06F 9/5083* (2013.01); *G06F 9/54* (2013.01); *G06F 11/0793* (2013.01);
(Continued)

(58) Field of Classification Search
None
See application file for complete search history.

(56) References Cited

U.S. PATENT DOCUMENTS 7,065,764 B1 6/2006 Prael et al.
7,716,336 B2 5/2010 Coppinger et al.
(Continued)

OTHER PUBLICATIONS

Hu, Shuihai, "Deadlocks in Datacenter Networks: Why Do They Form, and How to Avoid Them", HotNets-XV, (Nov. 2016), 7 pgs.
(Continued)

*Primary Examiner* — Fadi Haj Said
(74) *Attorney, Agent, or Firm* — Schwegman Lundberg & Woessner, P.A.

(57) ABSTRACT

Various approaches for service mech switching, including the use of infrastructure processing units (IPUs) and similar networked processing units, are disclosed. For example, a packet that includes a service request for a service may be received at a networking infrastructure device. The service may include an application that spans multiple nodes in a network. An outbound interface of the networking infrastructure device may be selected through which to route the packet. The selection of the outbound interface may be based on a service component of the service request in the packet and network metrics that correspond to the service. The packet may then be transmitted using the outbound interface.

25 Claims, 12 Drawing Sheets

(51) Int. Cl.

| | |
|---|---|
| ***G06F 9/38*** | (2018.01) |
| ***G06F 9/48*** | (2006.01) |
| ***G06F 9/50*** | (2006.01) |
| ***G06F 9/54*** | (2006.01) |
| ***G06F 11/07*** | (2006.01) |
| ***G06F 12/0846*** | (2016.01) |
| ***G06F 12/0873*** | (2016.01) |
| ***H04L 9/40*** | (2022.01) |
| ***H04L 41/5003*** | (2022.01) |
| ***H04L 67/10*** | (2022.01) |
| ***H04L 67/1087*** | (2022.01) |
| ***H04L 67/12*** | (2022.01) |

(52) U.S. Cl.

CPC ...... *G06F 12/0851* (2013.01); *G06F 12/0873* (2013.01); *H04L 63/0876* (2013.01); *H04L 63/12* (2013.01); *H04L 67/10* (2013.01); *H04L 67/1091* (2013.01); *H04L 67/12* (2013.01); *H04L 41/5003* (2013.01)

(56) References Cited

U.S. PATENT DOCUMENTS

| | | | |
|---|---|---|---|
| 7,861,246 | B2 | 12/2010 | Lu et al. |
| 9,363,087 | B2 | 6/2016 | Hawblitzel et al. |
| 9,811,380 | B1 | 11/2017 | Martin et al. |
| 9,906,493 | B1 | 2/2018 | Rodgers et al. |
| 10,044,696 | B2 | 8/2018 | Walker et al. |
| 10,389,800 | B2 | 8/2019 | Blainey et al. |
| 11,210,218 | B1 | 12/2021 | Tavallaei et al. |
| 11,288,096 | B2 | 3/2022 | Ugale et al. |
| 11,675,630 | B2 | 6/2023 | Behar et al. |
| 11,687,376 | B2 | 6/2023 | Cheng et al. |
| 11,924,060 | B2 | 3/2024 | Smith et al. |
| 2009/0279701 | A1* | 11/2009 | Moisand ............. H04L 12/1886 380/278 |
| 2011/0213508 | A1 | 9/2011 | Mandagere et al. |
| 2011/0239220 | A1 | 9/2011 | Gibson et al. |
| 2013/0261826 | A1 | 10/2013 | Mandagere et al. |
| 2014/0143781 | A1 | 5/2014 | Yao |
| 2015/0081893 | A1 | 3/2015 | Chadwell et al. |
| 2015/0089507 | A1 | 3/2015 | Nagao |
| 2015/0200854 | A1 | 7/2015 | Buchnik et al. |
| 2015/0229582 | A1 | 8/2015 | Zhu et al. |
| 2015/0268985 | A1 | 9/2015 | Jokinen et al. |
| 2015/0350089 | A1 | 12/2015 | Wang et al. |
| 2016/0004571 | A1 | 1/2016 | Smith |
| 2016/0350157 | A1 | 12/2016 | Necas |
| 2016/0380819 | A1 | 12/2016 | Burger |
| 2017/0286122 | A1 | 10/2017 | Wu et al. |
| 2018/0285766 | A1 | 10/2018 | Shen et al. |
| 2018/0373863 | A1 | 12/2018 | Domke |
| 2019/0034716 | A1 | 1/2019 | Kamarol et al. |
| 2019/0043201 | A1 | 2/2019 | Strong et al. |
| 2019/0116128 | A1 | 4/2019 | Guo et al. |
| 2019/0319807 | A1 | 10/2019 | Fairfax et al. |
| 2019/0327328 | A1* | 10/2019 | Smith ..................... H04L 12/14 |
| 2019/0370076 | A1 | 12/2019 | Behar et al. |
| 2019/0370084 | A1 | 12/2019 | Behar et al. |
| 2020/0065098 | A1 | 2/2020 | Parandeh Afshar et al. |
| 2020/0065290 | A1 | 2/2020 | Natu |
| 2020/0136906 | A1 | 4/2020 | Guim Bernat et al. |
| 2020/0250003 | A1 | 8/2020 | Yang et al. |
| 2020/0285523 | A1 | 9/2020 | Guim Bernat et al. |
| 2020/0372013 | A1 | 11/2020 | Lee et al. |
| 2020/0394045 | A1 | 12/2020 | Iwata |
| 2021/0011765 | A1 | 1/2021 | Doshi et al. |
| 2021/0097108 | A1 | 4/2021 | Goyal et al. |
| 2021/0109785 | A1 | 4/2021 | Prabhakaran et al. |
| 2021/0200592 | A1 | 7/2021 | Guim et al. |
| 2022/0046670 | A1 | 2/2022 | Lin |
| 2022/0164242 | A1 | 5/2022 | Sui et al. |
| 2022/0206849 | A1 | 6/2022 | Guim Bernat et al. |
| 2022/0286481 | A1 | 9/2022 | Shaw et al. |
| 2022/0400085 | A1 | 12/2022 | Ananthanarayanan et al. |
| 2023/0004433 | A1 | 1/2023 | Kan et al. |
| 2023/0132992 | A1 | 5/2023 | Bernat et al. |
| 2023/0133020 | A1 | 5/2023 | Sakalley et al. |
| 2023/0134683 | A1 | 5/2023 | Carranza et al. |
| 2023/0135645 | A1 | 5/2023 | Guim Bernat et al. |
| 2023/0136048 | A1 | 5/2023 | Doshi et al. |
| 2023/0136612 | A1 | 5/2023 | Doshi et al. |
| 2023/0136615 | A1 | 5/2023 | Guim Bernat et al. |
| 2023/0137879 | A1 | 5/2023 | Alam et al. |
| 2023/0140252 | A1 | 5/2023 | Carranza et al. |
| 2023/0199440 | A1 | 6/2023 | Lee et al. |
| 2023/0342478 | A1 | 10/2023 | Ranganathan et al. |
| 2023/0401099 | A1 | 12/2023 | Bruno et al. |
| 2023/0409233 | A1 | 12/2023 | Sheeley et al. |
| 2024/0020173 | A1 | 1/2024 | Chatterjee |
| 2024/0031221 | A1 | 1/2024 | Rajagopalan et al. |
| 2024/0112076 | A1 | 4/2024 | Jain et al. |
| 2024/0127392 | A1 | 4/2024 | Hughes et al. |

OTHER PUBLICATIONS

Kumar, Gautam, "Swift: Delay is Simple and Effective for Congestion Control in the Datacenter", SIGCOMM '20, (Aug. 2020), 15 pgs.
Mittal, Radhika, "Timely: RTT-Based Congestion Control for the Data Center", SIGCOMM, (Aug. 2015), 14 pgs.
"Elastics.cloud First to DemonstrateCXLtm Enabled Symmetric Multi HostMemory Pooling and Expansion", [Online]. Retrieved from the Internet https www.prnewswire.com news-releases elasticscloud-first-to-demonstrate-cxl-enabled-symmetric-multi-host-memory-pooling-and-expansion-301633093.html, Sep. 26, 2022, 3 pages.
"The GigaIO Fabrex Memory Fabric Memory Pooling Overview", [Online]. Retrieved from the Internet https gigaio.com project memory-pooling-overview , Feb. 2020, 8 pages.
"Marvell Announces Innovative CXL Development Platform for Multi-Host Memory Pooling", [Online]. Retrieved from the Internet https www.prnewswire.com news-releases marvell-announces-innovative-cxl-development-platform-for-multi-host-memory-pooling-301675043.html, Nov. 10, 2022, 3 pages.
"Intel Threading Building Blocks Tutorial v1.21", Intel Corporation, Oct. 27, 2011, 90 pages.
"U.S. Appl. No. 18/090,686, Non Final Office Action mailed Dec. 23, 2025", 8 pgs.
"U.S. Appl. No. 18/090,749, Non Final Office Action mailed Jan. 8, 2026", 11 pgs.
"U.S. Appl. No. 18/090,720, Non Final Office Action mailed Jan. 28, 2026", 13 pgs.
"U.S. Appl. No. 18/090,786, Non Final Office Action mailed Jan. 28, 2026", 21 pgs.
"U.S. Appl. No. 18/090,701, Non Final Office Action mailed Feb. 9, 2026", 9 pgs.
"U.S. Appl. No. 18/090,764, Non Final Office Action mailed Feb. 11, 2026", 15 pgs.
"U.S. Appl. No. 18/090,653, Non Final Office Action mailed Feb. 20, 2026", 25 pgs.
"U.S. Appl. No. 18/090,686, Response filed Mar. 4, 2026 to Non Final Office Action mailed Dec. 23, 2025", 9 pgs.
"U.S. Appl. No. 18/090,749, Response filed Apr. 7, 2026 to Non Final Office Action mailed Jan. 8, 2026", 13 pgs.
"U.S. Appl. No. 18/090,862, Notice of Allowance mailed Apr. 13, 2026", 11 pgs.
"U.S. Appl. No. 18/090,720, Response filed Apr. 16, 2026 to Non Final Office Action mailed Jan. 28, 2026", 12 pgs.
"U.S. Appl. No. 18/090,842, Non Final Office Action mailed Apr. 20, 2026", 17 pgs.
"U.S. Appl. No. 18/090,686, Notice of Allowance mailed Apr. 21, 2026", 6 pgs.
"U.S. Appl. No. 18/090,786, Response filed Apr. 23, 2026 to Non Final Office Action mailed Jan. 28, 2026", 11 pgs.
"U.S. Appl. No. 18/090,862, Corrected Notice of Allowability mailed Apr. 27, 2026", 2 pgs.

(56) References Cited

OTHER PUBLICATIONS

"U.S. Appl. No. 18/090,749, Final Office Action mailed May 4, 2026", 11 pgs.
"U.S. Appl. No. 18/090,686, Corrected Notice of Allowability mailed May 6, 2026", 2 pgs.
"U.S. Appl. No. 18/090,701, Response filed May 7, 2026 to Non Final Office Action mailed Feb. 9, 2026", 12 pgs.
"U.S. Appl. No. 18/090,764, Response filed May 7, 2026 to Non Final Office Action mailed Feb. 11, 2026", 11 pgs.
Ananthanarayanan, Ganesh, "Reining in the Outliers in Map Reduce Clusters using Mantri", 9th USENIX Symposium on Operating Systems Design and Implementation OSDI 10., 2010, 14 pages.
Moore, Andrew, "IPU-Based Cloud Infrastructure The Fulcrum for Digital Business", Intel Corporation, 2021, 6 pgs.
Nayyer, M. Z., "LBRO Load Balancing for Resource Optimization in Edge Computing", IEEE Access, vol. 10, pp. 97439-97449, doi 10.1109 ACCESS.2022.3205741., 2022, 11 pgs.

* cited by examiner

| Tiers | On-Premise Edge: Intelligent Sensor/GW (210) | | On-Premise Edge: Intelligent Edge (220) | | Network Edge (230) | | DC Edge (240) | | Core DC / Public Cloud (250, 260) | |
|---|---|---|---|---|---|---|---|---|---|---|
| Network Latencies (Wire Round Trip) | <1ms | | <1ms | | 1-5ms | | 5ms+1-2ms (every 100kms) | | 5ms+5 ms (every 400kms) | |
| Deployment Requirements | Compute Available Power: <50W<br>Form Factor: Small Box<br>Thermals: NEBs Mgmt.: Remote | | Compute Available Power: ~10KW<br>Form Factor: Rack(s)<br>Thermals: NEBS Or Standard DC<br>Mgmt.: Remote | | Compute Available Power: <600W<br>Form Factor: Pizza Box<br>Thermals: NEBS Mgmt.: Remote | | Compute Available Power: 9KW/rack/1KW Sqm<br>Form Factor: Rack(s)<br>Thermals: NEBS or Standard DC<br>Mgmt.: Remote | | Standard Data Center (DC) | |
| Where, What & Why | Use Case | KPI | Use Case | KPI | Use Case | KPI | Use Case | KPI | Use Case | KPI |
| | Intelligent Transportation | Data Privacy, Backhaul Traffic, Savings, Reliability | AR/VR | Latency. Backhaul Traffic Savings, Network Scalability | Intelligent Transportation | Data Privacy, Backhaul Traffic Savings, Reliability Throughput Latency | Intelligent Transportation | Data Privacy | CDN | Backhaul Traffic Savings, Throughput |
| | V2V | Latency | Retail | Data Privacy, Backhaul Traffic Savings, Reliability | V2V | Latency | Video Analytics | Same as Int. Transp. | | |
| | Retail | Same As Int. Transp. | | | Video Analytics | Same as Int. Transp. | Drone/IoT | Same As Int. Transp. | Storage GW | Same as CDN |
| | Video Analytics | Same as Int. Transp. | RT Streaming Healthcare | Same as AR/VR Access to Services | Drone/IoT | Same as Int. Transp. | Healthcare | Access to Services | | |
| | | | | | Rural | Access to Services | CDN & Storage | Backhaul Traffic Savings, Throughput | | |
| | | | | | | | Faas | Latency | | |
| | | | | | | | AR/VR/MR | Latency | | |

FIG. 3

SERVICE MESH SWITCHING

PRIORITY CLAIM

This application claims the benefit of priority to U.S. Provisional Patent Application No. 63/425,857, filed Nov. 16, 2022, and titled "COORDINATION OF DISTRIBUTED NETWORKED PROCESSING UNITS", which is incorporated herein by reference in its entirety.

TECHNICAL FIELD

Embodiments described herein generally relate to data processing, network communication, and communication system implementations of distributed computing, including the implementations with the use of networked processing units such as infrastructure processing units (IPUs) or data processing units (DPUs).

BACKGROUND

System architectures are moving to highly distributed multi-edge and multi-tenant deployments. Deployments may have different limitations in terms of power and space. Deployments also may use different types of compute, acceleration, and storage technologies in order to overcome these power and space limitations. Deployments also are typically interconnected in tiered and/or peer-to-peer fashion, in an attempt to create a network of connected devices and edge appliances that work together.

Edge computing, at a general level, has been described as systems that provide the transition of compute and storage resources closer to endpoint devices at the edge of a network (e.g., consumer computing devices, user equipment, etc.). As compute and storage resources are moved closer to endpoint devices, a variety of advantages have been promised such as reduced application latency, improved service capabilities, improved compliance with security or data privacy requirements, improved backhaul bandwidth, improved energy consumption, and reduced cost. However, many deployments of edge computing technologies—especially complex deployments for use by multiple tenants—have not been fully adopted.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 3 depicts additional characteristics of respective deployments tiers in a distributed edge computing environment, according to an example.

DETAILED DESCRIPTION

Figure 1:
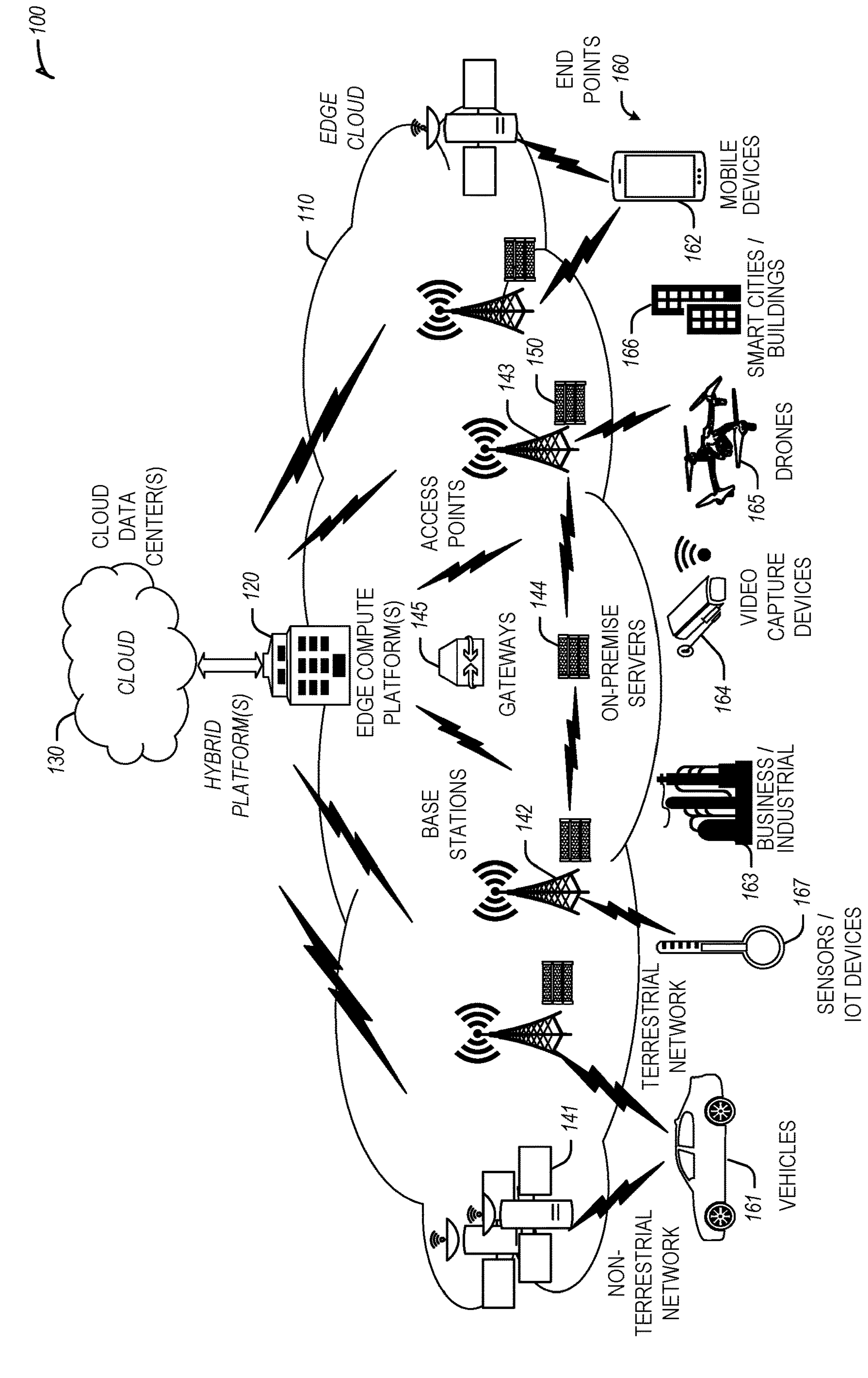
FIG. 1 illustrates an overview of a distributed edge computing environment, according to an example.

Cloud native applications continue to expand and find increased deployments. Issues that have arisen in cloud-native applications include challenges in monitoring, resource availability (e.g., resource limiting), observability, security, fault tolerance, among others. Software-based service meshes may be used to address some of these issues. Service meshes provide mechanisms to control, manage, monitor, or enforce traffic flow compliance using a cloud-based microservices application architecture. Service meshes may operate to provide an abstraction layer enabling administrators to manage access policies, for example, for every single pod or container in a cloud cluster (e.g., over Kubernetes, Openshift, etc.). The service meshes may include fine grained controls for monitoring and enforcement of network traffic flows.

Service mesh architectures may experience some issues, however. For example, there is generally an increased complexity when implementing a software-based service mesh. The increased complexity and component count may also lead to negative performance impacts, even for small microservice deployments. When common service mesh deployments are examined, many devices and thus many microservices, that are implemented entirely in software introduce performance overheads and generally encounter bottlenecks at the scales we expect cloud native deployments reach.

Function as a Service (FaaS) is an increasing popular technique to deploy aspects of cloud native applications. With FaaS, different functions may be deployed at different nodes of the cloud. When large scale use (e.g., deployments) are considered, difficulties in load balancing to evenly distribute traffic to execute nodes (e.g., function nodes) given tens of thousands of users executing such short-lived functions. Because the functions are often on different nodes of the cloud network, the question of load balancing is generally a question of routing requests. Another complexity with such routing occurs when the function may be available (e.g., initialized vs. simply installed) on some nodes and not in others. In this case, requests should be routed to nodes with the function available, considering both load balancing and cold start (e.g., initialization) time in case a node with the function locally (e.g., installed) will be instructed to initialize the function.

A cloud-native service mesh may be used to more effectively scale microservices, including FaaS. As noted earlier, using a software load balancer incurs performance overhead and increases complexity. There may be other issues if the software monitoring for the service mesh is incompatible with or missing global visibility or telemetry hooks. To deploy cloud native service meshes at scale, infrastructure hardware, such as network routers, switches, or network processing units such as infrastructure processing units (IPUs), are leveraged to perform more efficient execution of cloud native meshes at scale. These components are suited for the orchestration of mesh of functions executions due global observability of various platforms ability to provide access to named functions. These components also general have access to status and ability to control the network as a global entity connecting different named functions. Additionally, these components can provide registration of new function providers at scale. Additional details and examples are provided below.

FIG. 1 is a block diagram 100 showing an overview of a distributed edge computing environment, which may be adapted for implementing the present techniques for distributed networked processing units. As shown, the edge cloud 110 is established from processing operations among one or more edge locations, such as a satellite vehicle 141, a base station 142, a network access point 143, on premise servers 144, 150, a network gateway 145, or similar networked devices and equipment instances. These processing operations may be coordinated by one or more edge computing platforms 120 or systems that operate networked processing units (e.g., IPUs, DPUs) as discussed herein.

The edge cloud 110 is generally defined as involving compute that is located closer to endpoints 160 (e.g., consumer and producer data sources) than the cloud 130, such as autonomous vehicles 161, user equipment 162, business and industrial equipment 163, video capture devices 164, drones 165, smart cities and building devices 166, sensors and IoT devices 167, etc. Compute, memory, network, and storage resources that are offered at the entities in the edge cloud 110 can provide ultra-low or improved latency response times for services and functions used by the endpoint data sources as well as reduce network backhaul traffic from the edge cloud 110 toward cloud 130 thus improving energy consumption and overall network usages among other benefits.

Compute, memory, and storage are scarce resources, and generally decrease depending on the edge location (e.g., fewer processing resources being available at consumer end point devices than at a base station or a central office data center). As a general design principle, edge computing attempts to minimize the number of resources needed for network services, through the distribution of more resources that are located closer both geographically and in terms of in-network access time.

Figure 2:
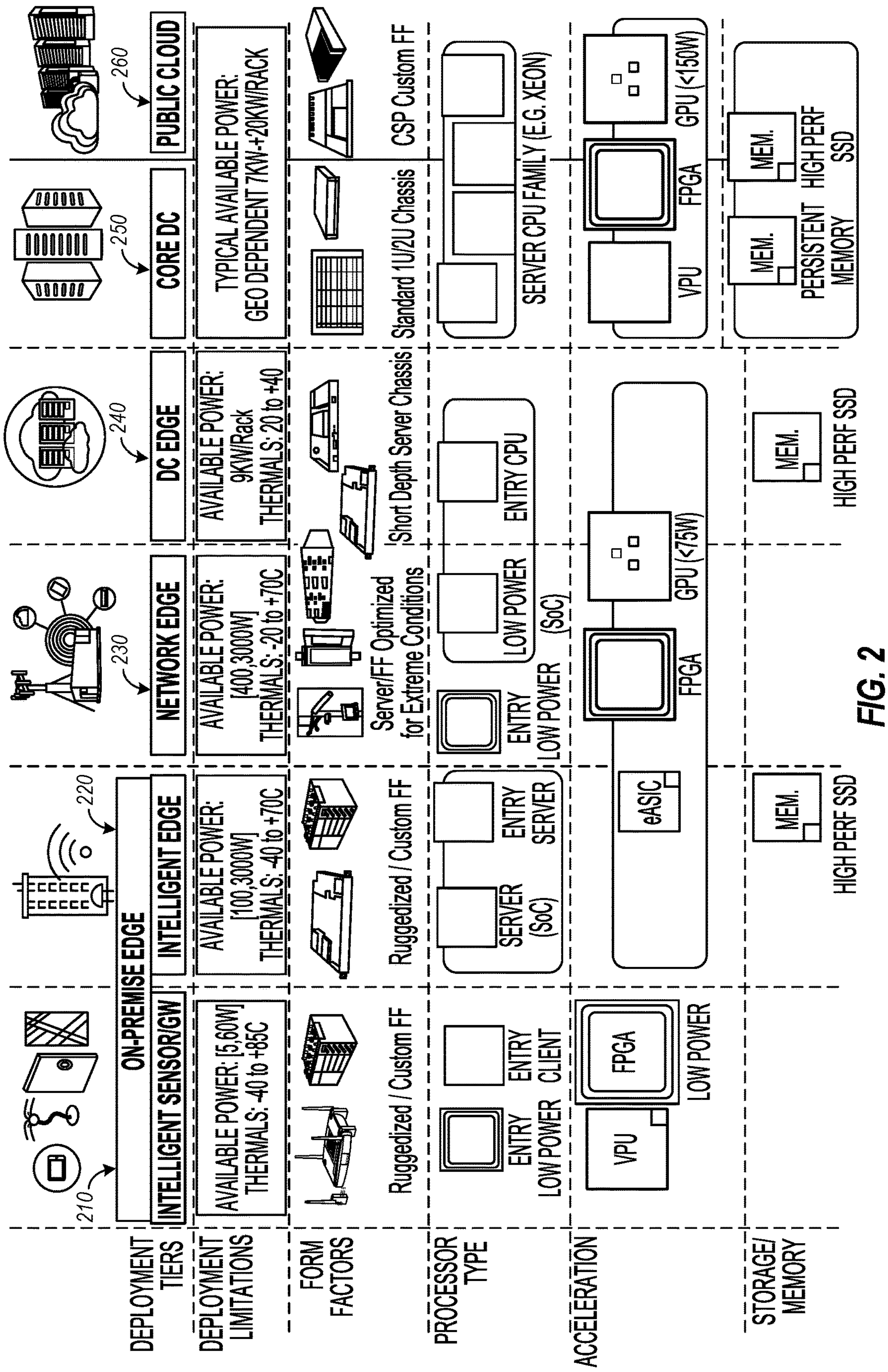
FIG. 2 depicts computing hardware provided among respective deployment tiers in a distributed edge computing environment, according to an example.

FIG. 2 depicts examples of computing hardware provided among respective deployment tiers in a distributed edge computing environment. Here, one tier at an on-premise edge system is an intelligent sensor or gateway tier 210, which operates network devices with low power and entry-level processors and low-power accelerators. Another tier at an on-premise edge system is an intelligent edge tier 220, which operates edge nodes with higher power limitations and may include a high-performance storage.

Further in the network, a network edge tier 230 operates servers including form factors optimized for extreme conditions (e.g., outdoors). A data center edge tier 240 operates additional types of edge nodes such as servers, and includes increasingly powerful or capable hardware and storage technologies. Still further in the network, a core data center tier 250 and a public cloud tier 260 operate compute equipment with the highest power consumption and largest configuration of processors, acceleration, storage/memory devices, and highest throughput network.

In each of these tiers, various forms of Intel® processor lines are depicted for purposes of illustration; it will be understood that other brands and manufacturers of hardware will be used in real-world deployments. Additionally, it will be understood that additional features or functions may exist among multiple tiers. One such example is connectivity and infrastructure management that enable a distributed IPU architecture, that can potentially extend across all of tiers 210, 220, 230, 240, 250, 260. Other relevant functions that may extend across multiple tiers may relate to security features, domain or group functions, and the like.

FIG. 3 depicts additional characteristics of respective deployment tiers in a distributed edge computing environment, based on the tiers discussed with reference to FIG. 2. This figure depicts additional network latencies at each of the tiers 210, 220, 230, 240, 250, 260, and the gradual increase in latency in the network as the compute is located at a longer distance from the edge endpoints. Additionally, this figure depicts additional power and form factor constraints, use cases, and key performance indicators (KPIs).

With these variations and service features in mind, edge computing within the edge cloud 110 may provide the ability to serve and respond to multiple applications of the use cases in real-time or near real-time and meet ultra-low latency requirements. As systems have become highly-distributed, networking has become one of the fundamental pieces of the architecture that allow achieving scale with resiliency, security, and reliability. Networking technologies have evolved to provide more capabilities beyond pure network routing capabilities, including to coordinate quality of service, security, multi-tenancy, and the like. This has also been accelerated by the development of new smart network adapter cards and other type of network derivatives that incorporated capabilities such as ASICs (application-specific integrated circuits) or FPGAs (field programmable gate arrays) to accelerate some of those functionalities (e.g., remote attestation).

In these contexts, networked processing units have begun to be deployed at network cards (e.g., smart NICs), gateways, and the like, which allow direct processing of network workloads and operations. One example of a networked processing unit is an infrastructure processing unit (IPU), which is a programmable network device that can be extended to provide compute capabilities with far richer functionalities beyond pure networking functions. Another example of a network processing unit is a data processing unit (DPU), which offers programmable hardware for performing infrastructure and network processing operations. The following discussion refers to functionality applicable to an IPU configuration, such as that provided by an Intel® line of IPU processors. However, it will be understood that functionality will be equally applicable to DPUs and other types of networked processing units provided by ARM®, Nvidia®, and other hardware OEMs.

Figure 4:
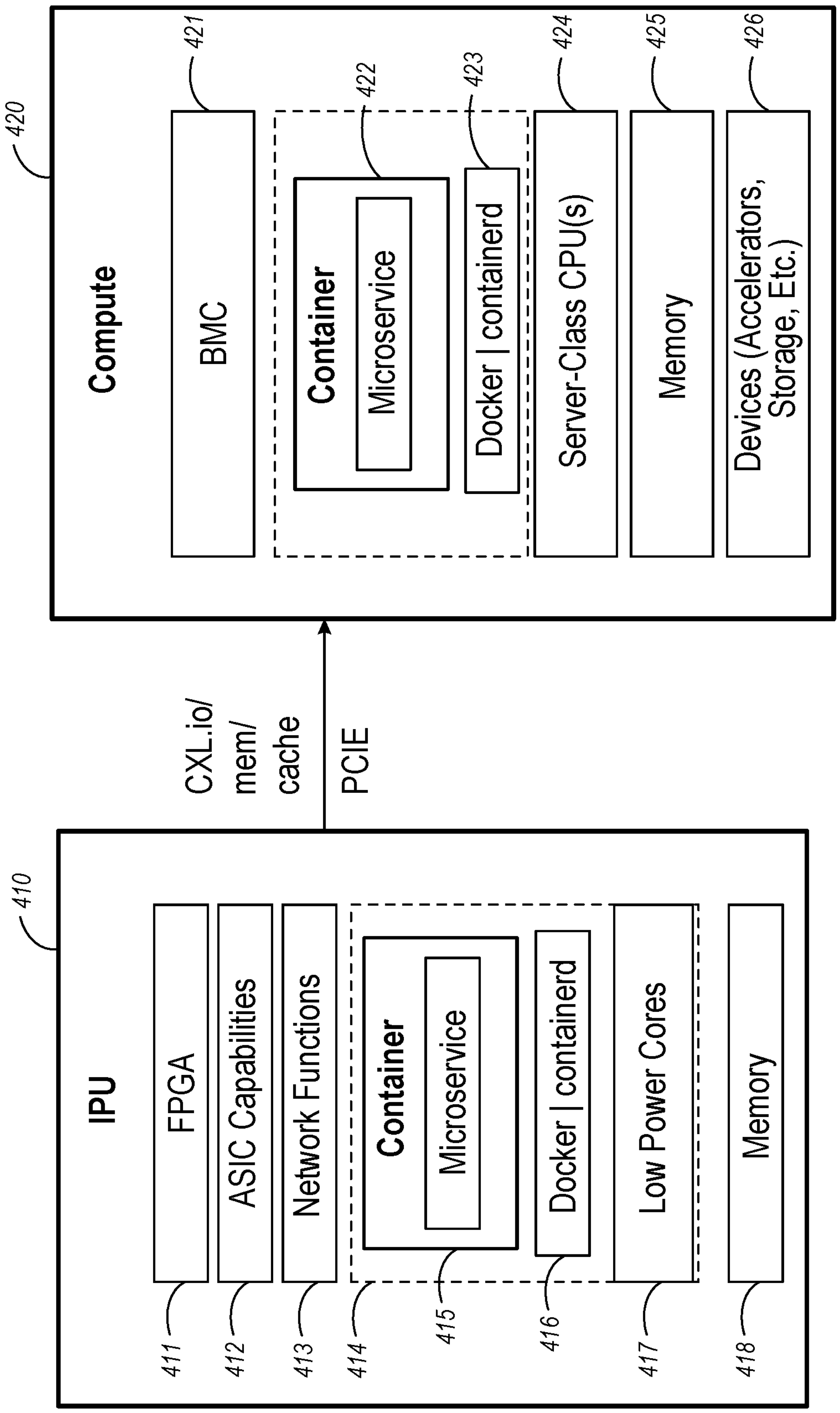
FIG. 4 depicts a computing system architecture including a compute platform and a network processing platform provided by an infrastructure processing unit, according to an example.

FIG. 4 depicts an example compute system architecture that includes a compute platform 420 and a network processing platform comprising an IPU 410. This architecture—and in particular the IPU 410—can be managed, coordinated, and orchestrated by the functionality discussed below, including with the functions described with reference to FIG. 6.

The main compute platform 420 is composed by typical elements that are included with a computing node, such as one or more CPUs 424 that may or may not be connected via a coherent domain (e.g. via Ultra Path Interconnect (UPI) or another processor interconnect); one or more memory units 425; one or more additional discrete devices 426 such as storage devices, discrete acceleration cards (e.g. an FPGA, a visual processing unit (VPU), etc.); a baseboard management controller 421; and the like. The compute platform 420 may operate one or more containers 422 (e.g., with one or more microservices), within a container runtime 423 (e.g., Docker containerd). The IPU 410 operates as a networking interface and is connected to the compute platform 420 using an interconnect (e.g., using either PCIe or CXL). The IPU 410, in this context, can be observed as another small compute device that has its own: (1) Processing cores (e.g., provided by low-power cores 417), (2) operating system (OS) and cloud native platform 414 to operate one or more containers 415 and a container runtime 416; (3) Acceleration functions provided by an ASIC 411 or FPGA 412; (4) Memory 418; (5) Network functions provided by network circuitry 413; etc.

From a system design perspective, this arrangement provides important functionality. The IPU 410 is seen as a discrete device from the local host (e.g., the OS running in the compute platform CPUs 424) that is available to provide certain functionalities (networking, acceleration etc.). Those functionalities are typically provided via Physical or Virtual PCIe functions. Additionally, the IPU 410 is seen as a host (with its own IP etc.) that can be accessed by the infrastructure to setup an OS, run services, and the like. The IPU 410 sees all the traffic going to the compute platform 420 and can perform actions—such as intercepting the data or performing some transformation—as long as the correct security credentials are hosted to decrypt the traffic. Traffic going through the IPU goes to all the layers of the Open Systems Interconnection model (OSI model) stack (e.g., from physical to application layer). Depending on the features that the IPU has, processing may be performed at the transport layer only. However, if the IPU has capabilities to perform traffic intercept, then the IPU also may be able to intercept traffic at the traffic layer (e.g., intercept CDN traffic and process it locally).

Some of the use cases being proposed for IPUs and similar networked processing units include: to accelerate network processing; to manage hosts (e.g., in a data center); or to implement quality of service policies. However, most of functionalities today are focused at using the IPU at the local appliance level and within a single system. These approaches do not address how the IPUs could work together in a distributed fashion or how system functionalities can be divided among the IPUs on other parts of the system. Accordingly, the following introduces enhanced approaches for enabling and controlling distributed functionality among multiple networked processing units. This enables the extension of current IPU functionalities to work as a distributed set of IPUs that can work together to achieve stronger features such as, resiliency, reliability, etc.

Distributed Architectures of IPUs

Figure 5:
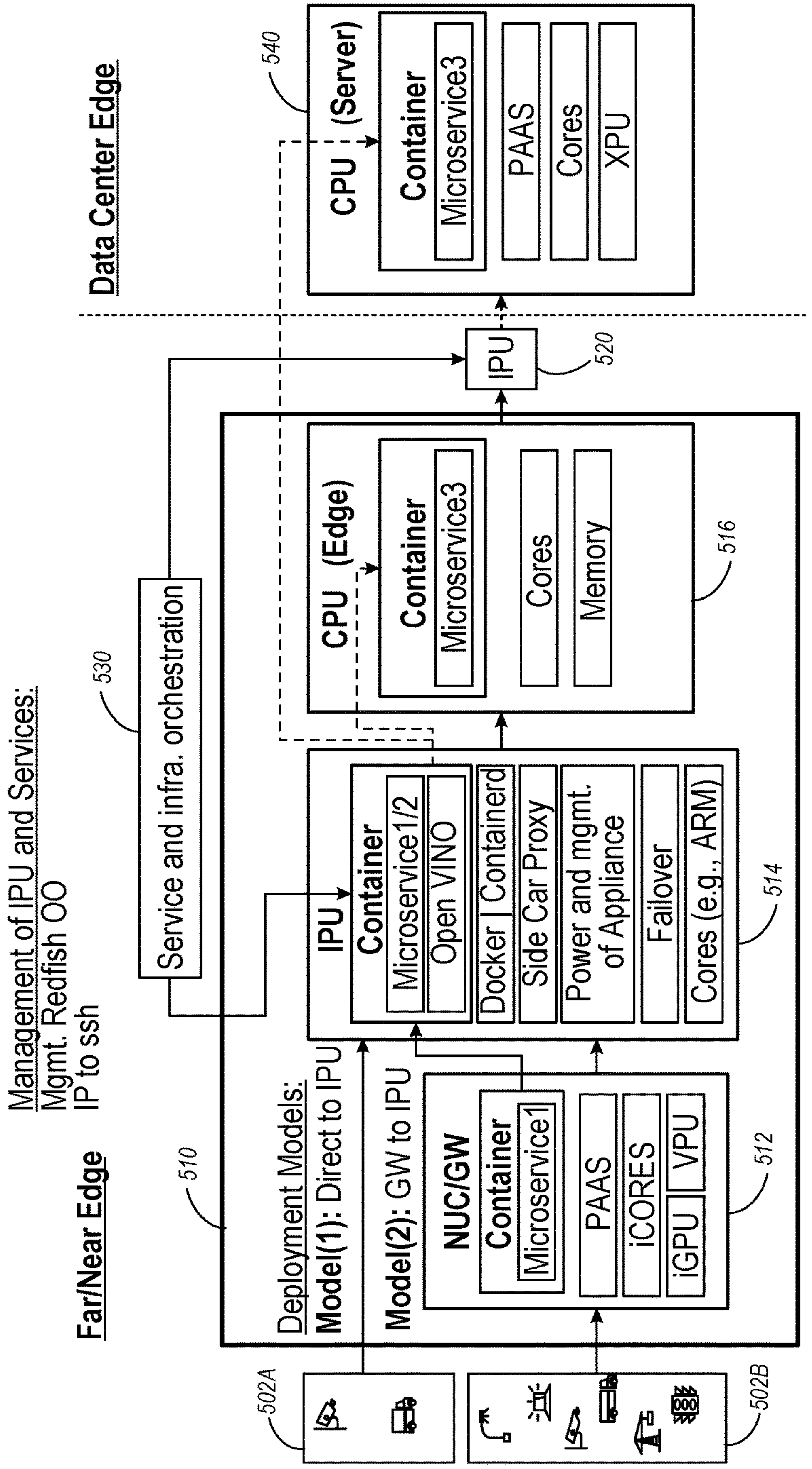
FIG. 5 depicts an infrastructure processing unit arrangement operating as a distributed network processing platform within network and data center edge settings, according to an example.

FIG. 5 depicts an IPU arrangement operating as a distributed network processing platform within network and data center edge settings. In a first deployment model of a computing environment 510, workloads or processing requests are directly provided to an IPU platform, such as directly to IPU 514. In a second deployment model of the computing environment 510, workloads or processing requests are provided to some intermediate processing device 512, such as a gateway or NUC (next unit of computing) device form factor, and the intermediate processing device 512 forwards the workloads or processing requests to the IPU 514. It will be understood that a variety of other deployment models involving the composability and coordination of one or more IPUs, compute units, network devices, and other hardware may be provided.

With the first deployment model, the IPU 514 directly receives data from use cases 502A. The IPU 514 operates one or more containers with microservices to perform processing of the data. As an example, a small gateway (e.g., a NUC type of appliance) may connect multiple cameras to an edge system that is managed or connected by the IPU 514. The IPU 514 may process data as a small aggregator of sensors that runs on the far edge, or may perform some level of inline or preprocessing and that sends payload to be further processed by the IPU or the system that the IPU connects.

With the second deployment model, the intermediate processing device 512 provided by the gateway or NUC receives data from use cases 502B. The intermediate processing device 512 includes various processing elements (e.g., CPU cores, GPUs), and may operate one or more microservices for servicing workloads from the use cases 502B. However, the intermediate processing device 512 invokes the IPU 514 to complete processing of the data.

In either the first or the second deployment model, the IPU 514 may connect with a local compute platform, such as that provided by a CPU 516 (e.g., Intel® Xeon CPU) operating multiple microservices. The IPU may also connect with a remote compute platform, such as that provided at a data center by CPU 540 at a remote server. As an example, consider a microservice that performs some analytical processing (e.g., face detection on image data), where the CPU 516 and the CPU 540 provide access to this same microservice. The IPU 514, depending on the current load of the CPU 516 and the CPU 540, may decide to forward the images or payload to one of the two CPUs. Data forwarding or processing can also depend on other factors such as a service level agreement (SLA) for latency or performance metrics (e.g., perf/watt) in the two systems. As a result, the distributed IPU architecture may accomplish features of load balancing.

The IPU in the computing environment 510 may be coordinated with other network-connected IPUs. In an example, a Service and Infrastructure orchestration manager 530 may use multiple IPUs as a mechanism to implement advanced service processing schemes for the user stacks. This may also enable implementing of system functionalities such as failover, load balancing etc.

In a distributed architecture example, IPUs can be arranged in the following non-limiting configurations. As a first configuration, a particular IPU (e.g., IPU 514) can work with other IPUs (e.g., IPU 520) to implement failover mechanisms. For example, an IPU can be configured to forward traffic to service replicas that runs on other systems when a local host does not respond.

As a second configuration, a particular IPU (e.g., IPU 514) can work with other IPUs (e.g., IPU 520) to perform load balancing across other systems. For example, consider a scenario where CDN traffic targeted to the local host is forwarded to another host in case that I/O or compute in the local host is scarce at a given moment.

As a third configuration, a particular IPU (e.g., IPU 514) can work as a power management entity to implement advanced system policies. For example, consider a scenario where the whole system (e.g., including CPU 516) is placed in a C6 state (a low-power/power-down state available to a processor) while forwarding traffic to other systems (e.g., IPU 520) and consolidating it.

As will be understood, fully coordinating a distributed IPU architecture requires numerous aspects of coordination and orchestration. The following examples of system architecture deployments provide discussion of how edge computing systems may be adapted to include coordinated IPUs, and how such deployments can be orchestrated to use IPUs at multiple locations to expand to the new envisioned functionality.

Distributed IPU Functionality

Figure 6:
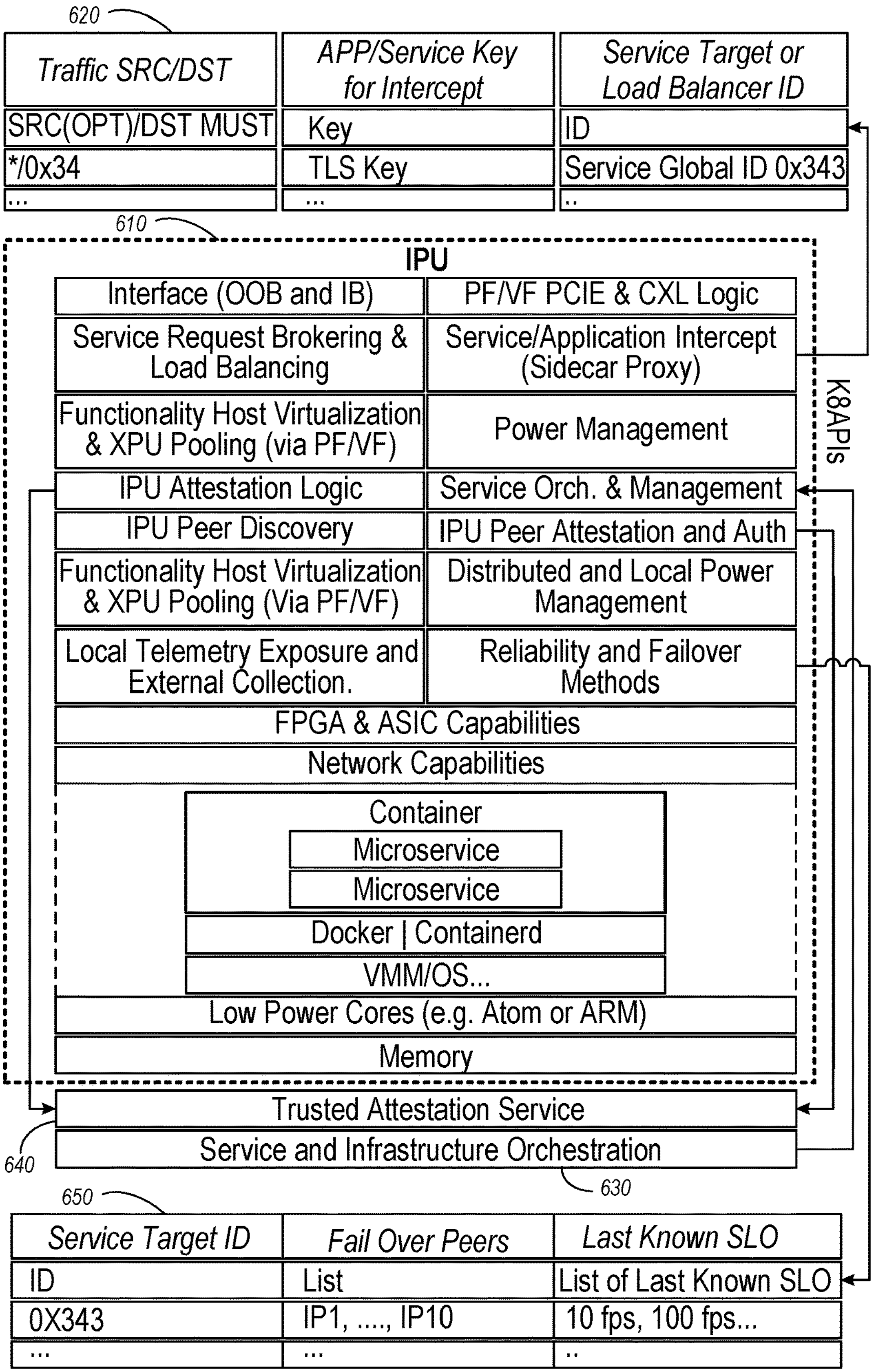
FIG. 6 depicts functional components of an infrastructure processing unit and related services, according to an example.

An arrangement of distributed IPUs offers a set of new functionalities to enable IPUs to be service focused. FIG. 6 depicts functional components of an IPU 610, including services and features to implement the distributed functionality discussed herein. It will be understood that some or all of the functional components provided in FIG. 6 may be distributed among multiple IPUs, hardware components, or platforms, depending on the particular configuration and use case involved.

In the block diagram of FIG. 6, a number of functional components are operated to manage requests for a service running in the IPU (or running in the local host). As discussed above, IPUs can either run services or intercept requests arriving to services running in the local host and perform some action. In the latter case, the IPU can perform the following types of actions/functions (provided as a non-limiting examples).

Peer Discovery. In an example, each IPU is provided with Peer Discovery logic to discover other IPUs in the distributed system that can work together with it. Peer Discovery logic may use mechanisms such as broadcasting to discover other IPUs that are available on a network. The Peer Discovery logic is also responsible to work with the Peer Attestation and Authentication logic to validate and authenticate the peer IPU's identity, determine whether they are trustworthy, and whether the current system tenant allows the current IPU to work with them. To accomplish this, an IPU may perform operations such as: retrieve a proof of identity and proof of attestation; connect to a trusted service running in a trusted server; or, validate that the discovered system is trustworthy. Various technologies (including hardware components or standardized software implementations) that enable attestation, authentication, and security may be used with such operations.

Peer Attestation. In an example, each IPU provides interfaces to other IPUs to enable attestation of the IPU itself. IPU Attestation logic is used to perform an attestation flow within a local IPU in order to create the proof of identity that will be shared with other IPUs. Attestation here may integrate previous approaches and technologies to attest a compute platform. This may also involve the use of trusted attestation service 640 to perform the attestation operations.

Functionality Discovery. In an example, a particular IPU includes capabilities to discover the functionalities that peer IPUs provide. Once the authentication is done, the IPU can determine what functionalities that the peer IPUs provide (using the IPU Peer Discovery Logic) and store a record of such functionality locally. Examples of properties to discover can include: (i) Type of IPU and functionalities provided and associated KPIs (e.g. performance/watt, cost etc.); (ii) Available functionalities as well as possible functionalities to execute under secure enclaves (e.g. enclaves provided by Intel® SGX or TDX technologies); (iii) Current services that are running on the IPU and on the system that can potentially accept requests forwarded from this IPU; or (iv) Other interfaces or hooks that are provided by an IPU, such as: Access to remote storage; Access to a remote VPU; Access to certain functions. In a specific example, service may be described by properties such as: UUID; Estimated performance KPIs in the host or IPU; Average performance provided by the system during the N units of time (or any other type of indicator); and like properties.

Service Management. The IPU includes functionality to manage services that are running either on the host compute platform or in the IPU itself. Managing (orchestration) services includes performance service and resource orchestration for the services that can run on the IPU or that the IPU can affect. Two type of usage models are envisioned:

External Orchestration Coordination. The IPU may enable external orchestrators to deploy services on the IPU compute capabilities. To do so, an IPU includes a component similar to K8 compatible APIs to manage the containers (services) that run on the IPU itself. For example, the IPU may run a service that is just providing content to storage connected to the platform. In this case, the orchestration entity running in the IPU may manage the services running in the IPU as it happens in other systems (e.g. keeping the service level objectives).

Further, external orchestrators can be allowed to register to the IPU that services are running on the host may require to broker requests, implement failover mechanisms and other functionalities. For example, an external orchestrator may register that a particular service running on the local compute platform is replicated in another edge node managed by another IPU where requests can be forwarded.

In this later use case external orchestrators may provide to the Service/Application Intercept logic the inputs that are needed to intercept traffic for these services (as typically is encrypted). This may include properties such as a source and destination traffic of the traffic to be intercepted, or the key to use to decrypt the traffic. Likewise, this may be needed to terminate TLS to understand the requests that arrive to the IPU and that the other logics may need to parse to take actions. For example, if there is a CDN read request the IPU may need to decrypt the packet to understand that network packet includes a read request and may redirect it to another host based on the content that is being intercepted. Examples of Service/Application Intercept information is depicted in table 620 in FIG. 6.

External Orchestration Implementation. External orchestration can be implemented in multiple topologies. One supported topology includes having the orchestrator managing all the IPUs running on the backend public or private cloud. Another supported topology includes having the orchestrator managing all the IPUs running in a centralized edge appliance. Still another supported topology includes having the orchestrator running in another IPU that is working as the controller or having the orchestrator running distributed in multiple other IPUs that are working as controllers (master/primary node), or in a hierarchical arrangement.

Functionality for Broker requests. The IPU may include Service Request Brokering logic and Load Balancing logic to perform brokering actions on arrival for requests of target services running in the local system. For instance, the IPU may decide to see if those requests can be executed by other peer systems (e.g., accessible through Service and Infrastructure Orchestration 630). This can be caused, for example, because load in the local systems is high. The local IPU may negotiate with other peer IPUs for the possibility to forward the request. Negotiation may involve metrics such as cost. Based on such negotiation metrics, the IPU may decide to forward the request.

Functionality for Load Balancing requests. The Service Request Brokering and Load Balancing logic may distribute requests arriving to the local IPU to other peer IPUs. In this case, the other IPUs and the local IPU work together and do not necessarily need brokering. Such logic acts similar to a cloud native sidecar proxy. For instance, requests arriving to the system may be sent to the service X running in the local system (either IPU or compute platform) or forwarded to a peer IPU that has another instance of service X running. The load balancing distribution can be based on existing algorithms such as based on the systems that have lower load, using round robin, etc.

Functionality for failover, resiliency and reliability. The IPU includes Reliability and Failover logic to monitor the status of the services running on the compute platform or the status of the compute platform itself. The Reliability and Failover logic may require the Load Balancing logic to transiently or permanently forward requests that aim specific services in situations such as where: i) The compute platform is not responding; ii) The service running inside the compute node is not responding; and iii) The compute platform load prevents the targeted service to provide the right level of service level objectives (SLOs). Note that the logic must know the required SLOs for the services. Such functionality may be coordinated with service information 650 including SLO information.

Functionality for executing parts of the workloads. Use cases such as video analytics tend to be decomposed in different microservices that conform a pipeline of actions that can be used together. The IPU may include a workload pipeline execution logic that understands how workloads are composed and manage their execution. Workloads can be defined as a graph that connects different microservices. The load balancing and brokering logic may be able to understand those graphs and decide what parts of the pipeline are executed where. Further, to perform these and other operations, Intercept logic will also decode what requests are included as part of the requests.

Resource Management

A distributed network processing configuration may enable IPUs to perform important role for managing resources of edge appliances. As further shown in FIG. 6, the functional components of an IPU can operate to perform these and similar types of resource management functionalities.

As a first example, an IPU can provide management or access to external resources that are hosted in other locations and expose them as local resources using constructs such as Compute Express Link (CXL). For example, the IPU could potentially provide access to a remote accelerator that is hosted in a remote system via CXL.mem/cache and IO. Another example includes providing access to remote storage device hosted in another system. In this later case the local IPU could work with another IPU in the storage system and expose the remote system as PCIE virtual function(s) (VF)/physical function(s) (PF) to the local host.

As a second example, an IPU can provide access to IPU-specific resources. Those IPU resource may be physical (such as storage or memory) or virtual (such as a service that provides access to random number generation).

As a third example, an IPU can manage local resources that are hosted in the system where it belongs. For example, the IPU can manage power of the local compute platform.

As a fourth example, an IPU can provide access to other type of elements that relate to resources (such as telemetry or other types of data). In particular, telemetry provides useful data for something that is needed to decide where to execute things or to identify problems.

I/O Management. Because the IPU is acting as a connection proxy between the external peers (compute systems, remote storage etc.) resources and the local compute, the IPU can also include functionality to manage I/O from the system perspective.

Host Virtualization and XPU Pooling. The IPU includes Host Virtualization and XPU Pooling logic responsible to manage the access to resources that are outside the system domain (or within the IPU) and that can be offered to the local compute system. Here, "XPU" refers to any type of a processing unit, whether CPU, GPU, VPU, an acceleration processing unit, etc. The IPU logic, after discovery and attestation, can agree with other systems to share external resources with the services running in the local system. IPUs may advertise to other peers available resources or can be discovered during discovery phase as introduced earlier. IPUs may request to other IPUS to those resources. For example, an IPU on system A may request access to storage on system B manage by another IPU. Remote and local IPUs can work together to establish a connection between the target resources and the local system.

Once the connection and resource mapping is completed, resources can be exposed to the services running in the local compute node using the VF/PF PCIE and CXL Logic. Each of those resources can be offered as VF/PF. The IPU logic can expose to the local host resources that are hosted in the IPU. Examples of resources to expose may include local accelerators, access to services, and the like.

Power Management. Power management is one of the key features to achieve favorable system operational expenditures (OPEXs). IPU is very well positioned to optimize power consumption that the local system is consuming. The Distributed and local power management unit meters the power that the system is consuming, the load that the system is receiving and track the service level agreements that the various services running in the system are achieving for the arriving requests. Likewise, when power efficiencies (e.g., power usage effectiveness (PUE)) are not achieving certain thresholds or the local compute demand is low, the IPU may decide to forward the requests to local services to other IPUs that host replicas of the services. Such power management features may also coordinate with the Brokering and Load Balancing logic discussed above. As will be understood, IPUs can work together to decide where requests can be consolidated to establish higher power efficiency as system. When traffic is redirected, the local power consumption can be reduced in different ways. Example operations that can be performed include: changing the system to C6 State; changing the base frequencies; performing other adaptations of the system or system components.

Telemetry Metrics. The IPU can generate multiple types of metrics that can be interesting from services, orchestration or tenants owning the system. In various examples, telemetry can be accessed, including: (i) Out of band via side interfaces; (ii) In band by services running in the IPU; or (iii) Out of band using PCIE or CXL from the host perspective. Relevant types of telemetries can include: Platform telemetry; Service Telemetry; IPU telemetry; Traffic telemetry; and the like.

System Configurations for Distributed Processing

Further to the examples noted above, the following configurations may be used for processing with distributed IPUs:

1) Local IPUs connected to a compute platform by an interconnect (e.g., as shown in the configuration of FIG. 4);
2) Shared IPUs hosted within a rack/physical network—such as in a virtual slice or multi-tenant implementation of IPUs connected via CXL/PCI-E (local), or extension via Ethernet/Fiber for nodes within a cluster;
3) Remote IPUs accessed via an IP Network, such as within certain latency for data plane offload/storage offloads (or, connected for management/control plane operations); or
4) Distributed IPUs providing an interconnected network of IPUs, including as many as hundreds of nodes within a domain.

Configurations of distributed IPUs working together may also include fragmented distributed IPUs, where each IPU or pooled system provides part of the functionalities, and each IPU becomes a malleable system. Configurations of distributed IPUs may also include virtualized IPUs, such as provided by a gateway, switch, or an inline component (e.g., inline between the service acting as IPU), and in some examples, in scenarios where the system has no IPU.

Other deployment models for IPUs may include IPU-to-IPU in the same tier or a close tier; IPU-to-IPU in the cloud (data to compute versus compute to data); integration in small device form factors (e.g., gateway IPUs); gateway/NUC+IPU which connects to a data center; multiple GW/NUC (e.g. 16) which connect to one IPU (e.g. switch); gateway/NUC+IPU on the server; and GW/NUC and IPU that are connected to a server with an IPU.

The preceding distributed IPU functionality may be implemented among a variety of types of computing architectures, including one or more gateway nodes, one or more aggregation nodes, or edge or core data centers distributed across layers of the network (e.g., in the arrangements depicted in FIGS. 2 and 3). Accordingly, such IPU arrangements may be implemented in an edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives. Such edge computing systems may be embodied as a type of device, appliance, computer, or other "thing" capable of communicating with other edge, networking, or endpoint components.

Figure 7:
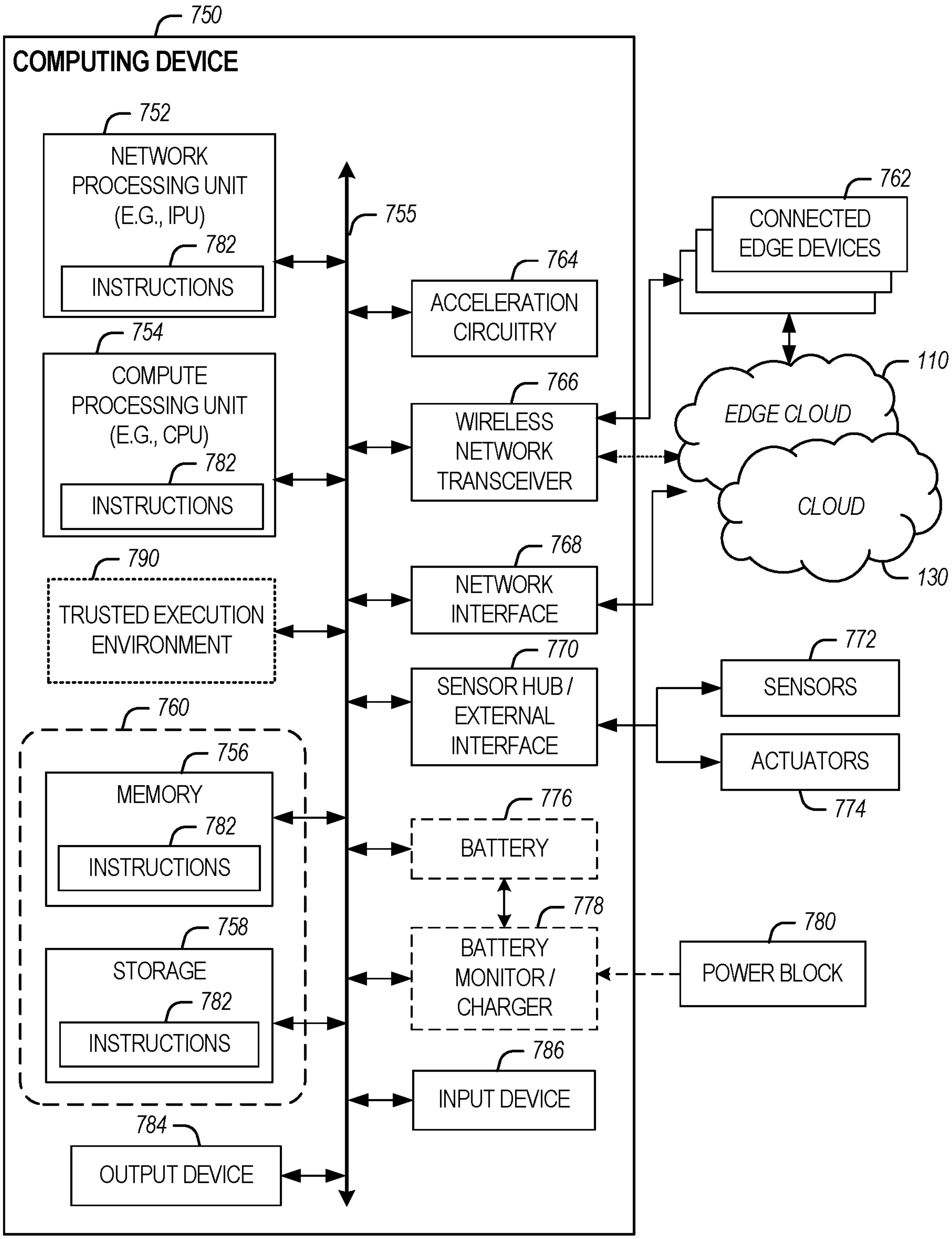
FIG. 7 depicts a block diagram of example components in an edge computing system which implements a distributed network processing platform, according to an example.

FIG. 7 depicts a block diagram of example components in a computing device 750 which can operate as a distributed network processing platform. The computing device 750 may include any combinations of the components referenced above, implemented as integrated circuits (ICs), as a package or system-on-chip (SoC), or as portions thereof, discrete electronic devices, or other modules, logic, instruction sets, programmable logic or algorithms, hardware, hardware accelerators, software, firmware, or a combination thereof adapted in the computing device 750, or as components otherwise incorporated within a larger system. Specifically, the computing device 750 may include processing circuitry comprising one or both of a network processing unit 752 (e.g., an IPU or DPU, as discussed above) and a compute processing unit 754 (e.g., a CPU).

The network processing unit 752 may provide a networked specialized processing unit such as an IPU, DPU, network processing unit (NPU), or other "xPU" outside of the central processing unit (CPU). The processing unit may be embodied as a standalone circuit or circuit package, integrated within an SoC, integrated with networking circuitry (e.g., in a SmartNIC), or integrated with acceleration circuitry, storage devices, or AI or specialized hardware, consistent with the examples above.

The compute processing unit 754 may provide a processor as a central processing unit (CPU) microprocessor, multi-core processor, multithreaded processor, an ultra-low voltage processor, an embedded processor, or other forms of a special purpose processing unit or specialized processing unit for compute operations.

Either the network processing unit 752 or the compute processing unit 754 may be a part of a system on a chip (SoC) which includes components formed into a single integrated circuit or a single package. The network processing unit 752 or the compute processing unit 754 and accompanying circuitry may be provided in a single socket form factor, multiple socket form factor, or a variety of other formats.

The processing units 752, 754 may communicate with a system memory 756 (e.g., random access memory (RAM)) over an interconnect 755 (e.g., a bus). In an example, the system memory 756 may be embodied as volatile (e.g., dynamic random access memory (DRAM), etc.) memory. Any number of memory devices may be used to provide for a given amount of system memory. A storage 758 may also couple to the processor 752 via the interconnect 755 to provide for persistent storage of information such as data, applications, operating systems, and so forth. In an example, the storage 758 may be implemented as non-volatile storage such as a solid-state disk drive (SSD).

The components may communicate over the interconnect 755. The interconnect 755 may include any number of technologies, including industry-standard architecture (ISA), extended ISA (EISA), peripheral component interconnect (PCI), peripheral component interconnect extended (PCIx), PCI express (PCIe), Compute Express Link (CXL), or any number of other technologies. The interconnect 755 may couple the processing units 752, 754 to a transceiver 766, for communications with connected edge devices 762.

The transceiver 766 may use any number of frequencies and protocols. For example, a wireless local area network (WLAN) unit may implement Wi-Fi® communications in accordance with the Institute of Electrical and Electronics Engineers (IEEE) 802.11 standard, or a wireless wide area network (WWAN) unit may implement wireless wide area communications according to a cellular, mobile network, or other wireless wide area protocol. The wireless network transceiver 766 (or multiple transceivers) may communicate using multiple standards or radios for communications at a different range. A wireless network transceiver 766 (e.g., a radio transceiver) may be included to communicate with devices or services in the edge cloud 110 or the cloud 130 via local or wide area network protocols.

The communication circuitry (e.g., transceiver 766, network interface 768, external interface 770, etc.) may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, an IoT protocol such as IEEE 802.15.4 or ZigBee®, Matter®, low-power wide-area network (LPWAN) or low-power wide-area (LPWA) protocols, etc.) to effect such communication. Given the variety of types of applicable communications from the device to another component or network, applicable communications circuitry used by the device may include or be embodied by any one or more of components 766, 768, or 770. Accordingly, in various examples, applicable means for communicating (e.g., receiving, transmitting, etc.) may be embodied by such communications circuitry.

The computing device 750 may include or be coupled to acceleration circuitry 764, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 755 may couple the processing units 752, 754 to a sensor hub or external interface 770 that is used to connect additional devices or subsystems. The devices may include sensors 772, such as accelerometers, level sensors, flow sensors, optical light sensors, camera sensors, temperature sensors, global navigation system (e.g., GPS) sensors, pressure sensors, pressure sensors, and the like. The hub or interface 770 further may be used to connect the edge computing node 750 to actuators 774, such as power switches, valve actuators, an audible sound generator, a visual warning device, and the like.

In some optional examples, various input/output (I/O) devices may be present within or connected to, the edge computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as LEDs or more complex outputs such as display screens (e.g., LCD screens), with the output of characters, graphics, multimedia objects, and the like being generated or produced from the operation of the edge computing node 750.

A battery 776 may power the edge computing node 750, although, in examples in which the edge computing node 750 is mounted in a fixed location, it may have a power supply coupled to an electrical grid, or the battery may be used as a backup or for temporary capabilities. A battery monitor/charger 778 may be included in the edge computing node 750 to track the state of charge (SoCh) of the battery 776. The battery monitor/charger 778 may be used to monitor other parameters of the battery 776 to provide failure predictions, such as the state of health (SoH) and the state of function (SoF) of the battery 776. A power block 780, or other power supply coupled to a grid, may be coupled with the battery monitor/charger 778 to charge the battery 776.

In an example, the instructions 782 on the processing units 752, 754 (separately, or in combination with the instructions 782 of the machine-readable medium 760) may configure execution or operation of a trusted execution environment (TEE) 790. In an example, the TEE 790 operates as a protected area accessible to the processing units 752, 754 for secure execution of instructions and secure access to data. Other aspects of security hardening, hardware roots-of-trust, and trusted or protected operations may be implemented in the edge computing node 750 through the TEE 790 and the processing units 752, 754.

The computing device 750 may be a server, appliance computing devices, and/or any other type of computing device with the various form factors discussed above. For example, the computing device 750 may be provided by an appliance computing device that is a self-contained electronic device including a housing, a chassis, a case, or a shell.

In an example, the instructions 782 provided via the memory 756, the storage 758, or the processing units 752, 754 may be embodied as a non-transitory, machine-readable medium 760 including code to direct the processor 752 to perform electronic operations in the edge computing node 750. The processing units 752, 754 may access the non-transitory, machine-readable medium 760 over the interconnect 755. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processing units 752, 754 to perform a specific sequence or flow of actions, for example, as described with respect to the flowchart(s) and block diagram(s) of operations and functionality discussed herein. As used herein, the terms "machine-readable medium", "machine-readable storage", "computer-readable storage", and "computer-readable medium" are interchangeable.

In further examples, a machine-readable medium also includes any tangible medium that is capable of storing, encoding, or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers.

In an example, a software distribution platform (e.g., one or more servers and one or more storage devices) may be used to distribute software, such as the example instructions discussed above, to one or more devices, such as example processor platform(s) and/or example connected edge devices noted above. The example software distribution platform may be implemented by any computer server, data facility, cloud service, etc., capable of storing and transmitting software to other computing devices. In some examples, the providing entity is a developer, a seller, and/or a licensor of software, and the receiving entity may be consumers, users, retailers, OEMs, etc., that purchase and/or license the software for use and/or re-sale and/or sub-licensing.

In an example, the instructions are stored on storage devices of the software distribution platform in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions stored in the software distribution platform are in a first format when transmitted to an example processor platform(s). In some examples, the first format is an executable binary in which particular types of the processor platform(s) can execute. However, in some examples, the first format is uncompiled code that requires one or more preparation tasks to transform the first format to a second format to enable execution on the example processor platform(s). For instance, the receiving processor platform(s) may need to compile the computer readable instructions in the first format to generate executable code in a second format that is capable of being executed on the processor platform(s). In still other examples, the first format is interpreted code that, upon reaching the processor platform(s), is interpreted by an interpreter to facilitate execution of instructions.

Circuitry (e.g., processing circuitry) is a collection of circuits implemented in tangible entities of the computing device 750 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Figure 8:
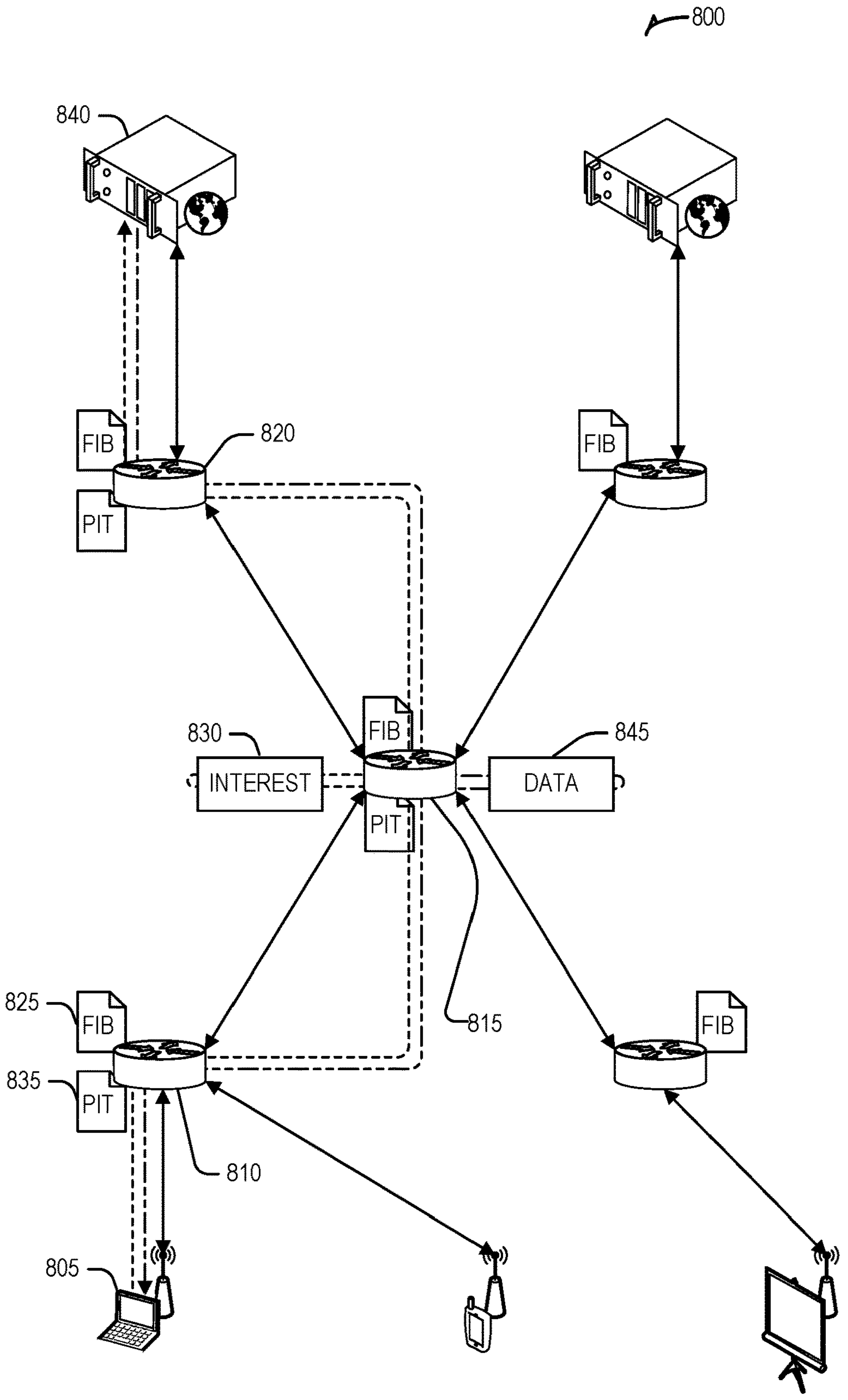
FIG. 8 depicts an information centric network (ICN), according to an example.

FIG. 8 depicts an information centric network (ICN), according to an example. ICNs operate differently than traditional host-based (e.g., address-based) communication networks. ICN is an umbrella term for a networking paradigm in which information (e.g., a named data network (NDN)) or functions (e.g., a named function network (NFN)) are named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 805 (e.g., subscriber) requests named content from the network itself. The content request may be called an interest and transmitted via an interest packet 830. As the interest packet traverses network devices (e.g., network elements, routers, switches, hubs, etc.)—such as network elements 810, 815, and 820—a record of the interest is kept, for example, in a pending interest table (PIT) at each network element. Thus, network element 810 maintains an entry in its PIT 835 for the interest packet 830, network element 815 maintains the entry in its PIT, and network element 820 maintains the entry in its PIT.

When a device, such as publisher 840, that has content matching the name in the interest packet 830 is encountered, that device 840 may send a data packet 845 in response to the interest packet 830. Typically, the data packet 845 is tracked back through the network to the source (e.g., device 805) by following the traces of the interest packet 830 left in the network element PITs. Thus, the PIT 835 at each network element establishes a trail back to the subscriber 805 for the data packet 845 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 830 traverses the ICN, ICN network elements will generally attempt to match the name to a greatest degree. Thus, if an ICN element has a cached item or route for both "www.somedomain.com or videos" and "www.somedomain.com or videos or v8675309," the ICN element will match the later for an interest packet 830 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 830 to data cached in the ICN element. Thus, for example, if the data 845 named in the interest 830 is cached in network element 815, then the network element 815 will return the data 845 to the subscriber 805 via the network element 810. However, if the data 845 is not cached at network element 815, the network element 815 routes the interest 830 on (e.g., to network element 820). To facilitate routing, the network elements may use a forwarding information base 825 (FIB) to match named data to an interface (e.g., physical port) for the route. Thus, the FIB 825 operates much like a routing table on a traditional network device.

In an example, additional meta-data may be attached to the interest packet 830, the cached data, or the route (e.g., in the FIB 825), to provide an additional level of matching. For example, the data name may be specified as "www.somedomain.com or videos or v8675309," but also include a version number—or timestamp, time range, endorsement, etc. In this example, the interest packet 830 may specify the desired name, the version number, or the version range. The matching may then locate routes or cached data matching the name and perform the additional comparison of meta-data or the like to arrive at an ultimate decision as to whether data or a route matches the interest packet 830 for respectively responding to the interest packet 830 with the data packet 845 or forwarding the interest packet 830.

ICN has advantages over host-based networking because the data segments are individually named. This enables aggressive caching throughout the network as a network element may provide a data packet 830 in response to an interest 830 as easily as an original author 840. Accordingly, it is less likely that the same segment of the network will transmit duplicates of the same data requested by different devices.

Fine grained encryption is another feature of many ICN networks. A typical data packet 845 includes a name for the data that matches the name in the interest packet 830. Further, the data packet 845 includes the requested data and may include additional information to filter similarly named data (e.g., by creation time, expiration time, version, etc.). To address malicious entities providing false information under the same name, the data packet 845 may also encrypt its contents with a publisher key or provide a cryptographic hash of the data and the name. Thus, knowing the key (e.g., from a certificate of an expected publisher 840) enables the recipient to ascertain whether the data is from that publisher 840. This technique also facilitates the aggressive caching of the data packets 845 throughout the network because each data packet 845 is self-contained and secure. In contrast, many host-based networks rely on encrypting a connection between two hosts to secure communications. This may increase latencies while connections are being established and prevents data caching by hiding the data from the network elements.

Example ICN networks include content centric networking (CCN), as specified in the Internet Engineering Task Force (IETF) draft specifications for CCNx 0.x and CCN 1.x, and named data networking (NDN), as specified in the NDN technical report DND-0001.

Figure 9:
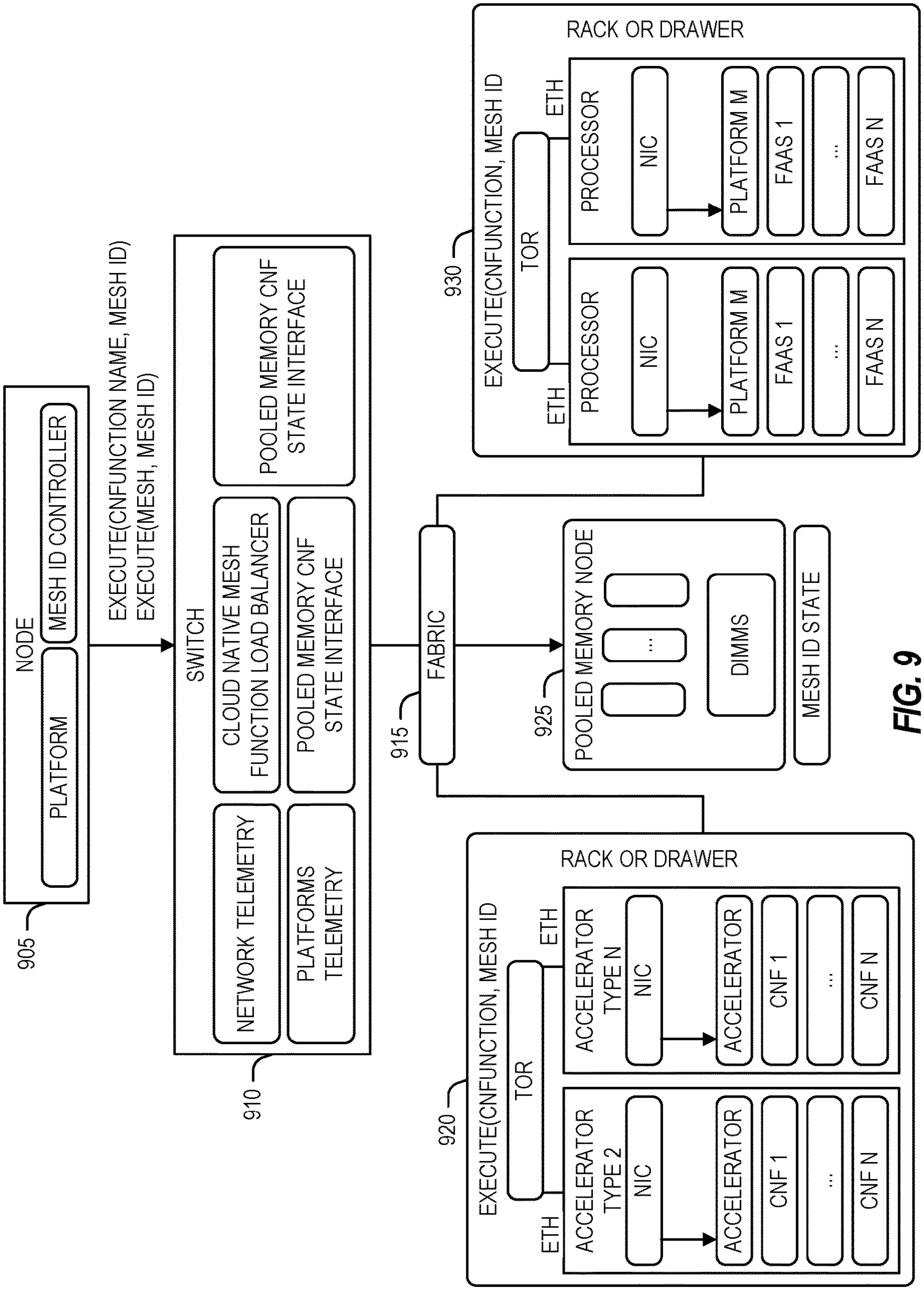
FIG. 9 depicts an architecture for service mesh switching, according to an example.

FIG. 9 depicts an architecture for service mesh switching, according to an example. The illustrated architecture includes a node 905 connected to pooled memory 925, an execution node 920, and execution node 930 via a switch 910 and a network fabric 915. The execution nodes 920 and 930 provide hardware and software to execute service components (e.g., FaaS functions) for the node 905 to implement a service. Although the illustrated example is the switch 910, other network entities through which traffic passes may be used, such as a gateway, router, or mesh node.

To implement a cloud-native service mesh more efficiently, the switch 910 is configured to perform more efficient execution of cloud native meshes than software managed meshes at large scales. In general, the switch 910 is effectively positioned to orchestrate execution of function meshes because the switch generally has global observability of the status of the various platforms (e.g., the execution node 920, the pooled memory 925, or the execution node 930) providing access to named functions and storage. Additionally, the switch 910 generally is able to obtain the status and to control aspects of the network (e.g., via connections to other network nodes) as a global entity connecting different named functions. The switch 910 may also be configured to efficiently register new function providers (e.g., additional execution nodes) at large scales.

To implement cloud native service mesh routing, the switch 910 may include processing circuitry such as a network processing unit (e.g., an IPU) configured to schedule functions that need to be executed as part of a service mesh (e.g., a service). Network features, such as telemetry, Quality of Service (QoS), etc., and end-point telemetry (e.g., usage on of the various function providers for a given named function or service) may be employed to route service requests (e.g., function calls). Here, the switch 910 is configured to provide load balancing while maintaining the SLAs of the service, whether the SLA be intrinsic to the service components or externally defined. The switch 910 may include an IPU to provide hardware support (e.g., infrastructure) to other pieces of the platform. In an example, the switch (e.g., the IPU of the switch) implements name-based routing and message semantics (e.g., ICN semantics) to support service request routing.

The switch 910 includes circuitry (e.g., in an IPU) to schedule and execute a service (e.g., a full mesh of service components). In an example, the switch 910 is configured to provide a service (e.g., mesh) description containing a graph with a set of service components (e.g., named functions). In an example, the graph contains an overall SLA or SLAs for one or more of the service components. The switch 910 is configured to facilitate execution of the service end-to-end using, for example, the pooled memory 925 to store or propagate service state to the multiple function providers, such as the execution node 920 or the execution node 930. In an example, the switch 910 is configured to move some service components to other memory pools or storage facilities to be closer to execution nodes being used or the state of the network.

In an example, the switch 910 is configured to manage named functions provided by the infrastructure, such as an IPU in the switch 910 or accelerators in the execution nodes 920 or 930. Such management may include managing new instances of service components that are added or removed to provides elasticity to the service mesh. In an example, the switch 910 is configured to support multiple tenants through, for example, name and tenant-based function routing, tenant based QoS requirements, etc.

The following examples provide additional detail of the switch 910 configuration and operation according to an example. In these examples, the switch 910 is a networking infrastructure device that includes processing circuitry. However, other networking infrastructure devices, such as network interface cards (NICs) or their equivalent, IPUs, routers, etc., may be a networking infrastructure device configured in a similar manner.

In operation, the processing circuitry is configured to receive a packet. This packet includes a service request for a service. In a NFN arrangement, the service request may be an interest packet naming a function (e.g., service component). In an example, the service includes an application that spans multiple nodes in the network to which the networking infrastructure device belongs. Such an application is a form of cloud-native mesh where the service components are distributed to various nodes in the cloud and organized into the function. In an example, the service or the application is defined by a graph in which vertices are functions and edges indicate inputs (e.g., parameters) or outputs. In an example, the graph includes an SLA for the service. In an example, an edge includes an SLA for an interaction between two functions.

The processing circuitry is configured to select an outbound interface of the switch 910—which has multiple outbound interfaces— through which to route the packet. Generally, an outbound interface is any interface through which received traffic may be sent. Often, the outbound interfaces are those network interface that did not receive the request. The selection of the outbound interface among the other outbound interfaces is based on the service component, of the service request, that is specified in the received packet. The processing circuitry is configured to also base the selection of the outbound interface on network metrics that correspond to the service. Here, the network metrics may include traffic flows (e.g., counts of service requests for the same service or for the same service component), current utilization of an execution node, network latencies, etc. Consideration of the network metrics enables load balancing by distributing service requests for the service among available execution nodes or distributing network traffic among different network segments depending upon use.

In an example, the switch 910 includes a service registry. The service registry is a data structure (e.g., a database, table, object file, structured data, etc.) that encapsulates data about a service in fields, cells, buckets, etc. The service registry enables the switch 910 to track service specific details. Such details may include available execution nodes, deployment or operating status of service components on execution nodes, SLAs pertinent to a service, security or attestation data, etc. In an example, the service has a corresponding entry in the service registry of the switch 910. In an example, at least a portion of the network metrics that correspond to the service are stored in the corresponding entry of the service registry. Maintaining the network metrics in the service registry provides an efficient data structure in which to structure data management for network-metric based routing when presented with a service request for the service.

In an example, the switch 910 implements an ICN. In an example, the switch 910 includes a FIB to match the name for a named function in the service request to the outbound interface. In an example, the FIB includes the network metrics that correspond to names that are part of the service. In an example, the service registry can be reference in the FIB or the service registry may reference the FIB to connect the service registry and the FIB to support ICN semantics. In an example, a second outbound interface matches the name for the named function. In an example, the outbound interface is selected based on network metrics for the outbound interface indicating greater performance of the service than network metrics for the second outbound interface. In these last few examples, the FIB indicates that either of the two outbound interfaces are acceptable from a connectivity perspective. However, the first outbound interface is selected over the second based on the beneficial performance achieved-based on the network metrics—by that selection.

In an example, the processing circuitry is configured to receive a portion of the network metrics from a second switch. In this example, the portion of the network metrics received from the second switch relate to nodes directly connected to the second switch. In these examples, the switches, including the switch 910, are generally connected via a control plane. These switches also service some number of nodes that are directly connected to the ports (e.g., interfaces) of the switches. Thus, the switch 910 may provide connectivity for a segment of the network. The inter-switch communication enables intra-segment coordination of the service mesh.

After the outbound interface is selected, the processing circuitry is configured to transmit the packet through this interface. Thus, the service component of the service is promulgated onto the execution node 920, for example, to complete this portion of orchestrating the service execution for the node 905.

Figure 10:
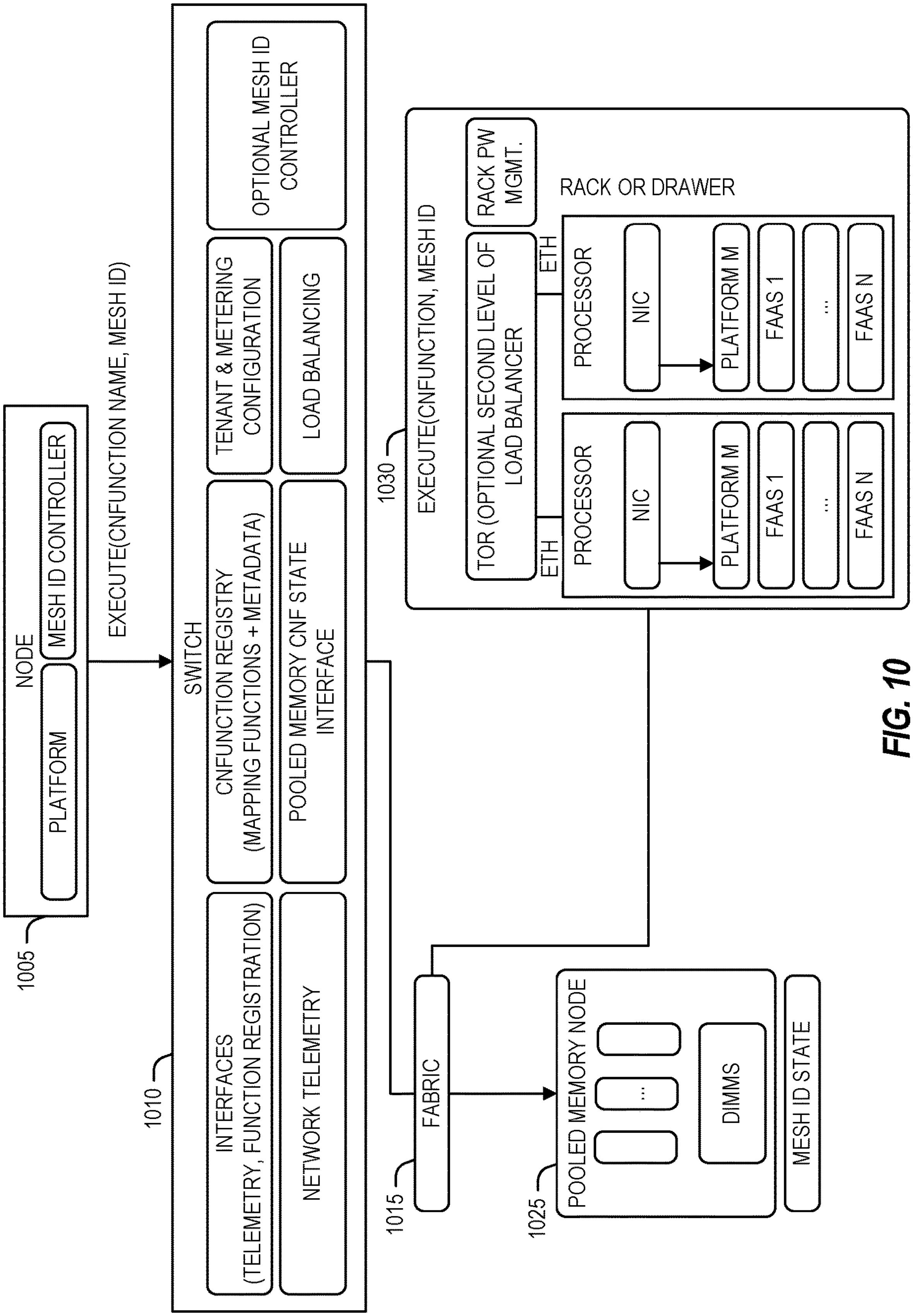
FIG. 10 depicts an architecture for service mesh switching, according to an example.

FIG. 10 depicts an architecture for service mesh switching, according to an example. This architecture is similar to that illustrated in FIG. 9. A node 1005 is connected to a pooled memory 1025 and an execution node 1030 via a switch 1010 and fabric 1015. The components of the switch 1010 may be group into three function units, that of managing named functions provided by the infrastructure, interfaces to access the cloud-native switching, and service mesh execution including service component routing.

With respect to named function management—including adding or removing functions and multi-tenant management—the switch includes an interface to register new named functions. This registration interface accepts fields, such as the following table:

1. Function Name. This is generally required to be unique for a tenant.
2. Tenant ID.
3. Meta-data describing the function.
4. Flavor of the function. The flavor, or type, provides details of execution that may vary between functions that accept the same parameters and produce the same output. For example, is the function FPGA-based, GPU-based, etc.
5. Specific flavor implementation. This is additional detail to that provided in 4.
6. Meta-data for the flavor potentially used in scheduling. For example, how accurate is the estimate of execution completion? More accurate reports of completion times may enable tighter tolerance in network latency, for example.
7. Identification of an endpoint (e.g., execution node 1030) implementing the function. The identification may include a media access control (MAC) address, an Internet protocol (IP), or some other unique identifier.
8. An SLA that the platform can provide.

Table

The switch 1010 may include a remove interface to delete a given function. The switch 1010 may also include a telemetry interface. The telemetry interface is configured to provide telemetry (e.g., network or execution metrics) for a given function name implemented in a particular platform, for example. Examples of the telemetry returned by the telemetry interface may include a current load (e.g., on a platform), current expected turn-around time for function execution—including queuing, context switching, etc.—or next available timeslots for executing the function (e.g., on that platform).

The cloud-native (CN) function (CNFunction) switching, or orchestration, provided by the switch 1010 may be accessed by the node 1005 via an execution interface to invoke execution a particular named function. Here, the service mesh may be managed by another entity (such as another node). The execution interface may include several parameters, such as the name of the function, a tenant requesting the execution, and possibly an SLA (e.g., in time-to-complete or the like).

The switch 1010 may implement a definition interface to enable the definition of a service mesh. In an example, the definition interface produces a graph of functions to establish dependencies between functions. In an example, the graph includes SLAs of the dependencies (e.g., on edges) or generally for the service mesh.

The switch 1010 is configured to include routing and scheduling to execute the service mesh. With respect to routing, the switch 1010 is configured to use network features network features (such as telemetry, QoS etc.) plus end-point telemetry (e.g., usage on of the various function providers for a given named function) to govern how and where to route the execution of a function. In general, the routing is configured to provide load balancing while meeting the SLAs of service mesh execution. This is generally possible because the switch 1010 connects the infrastructure to the platform.

Aside from routing specific function executions, the switch 1010 may be configured to schedule the functions within the context of a service mesh definition. For example, on a request coming from the node 1005, the switch 1010 is configured to search for various named functions for that tenant that match the request. The switch 1010 is configured to then filter the named functions by the SLA required for the function in the service mesh definition and known latencies for network transport as well as function execution. For example, the SLA may be specified in latency and include one or more of the following times:

1. Network latency to transfer the data from the pooled memory 1025 to the function provider (execution node 1030) if any data will be transferred.
2. Network latency to send the service request to the function provider.
3. A time estimate to process the named function by the specific provider. This estimate may be calculated or extracted from data provided at the function registration or via observations of other service requests for the service component involved.
   a. Once it has a set of different candidates it may perform load balancing across them in order to maximize load balancing both at compute and network level.

Figure 11:
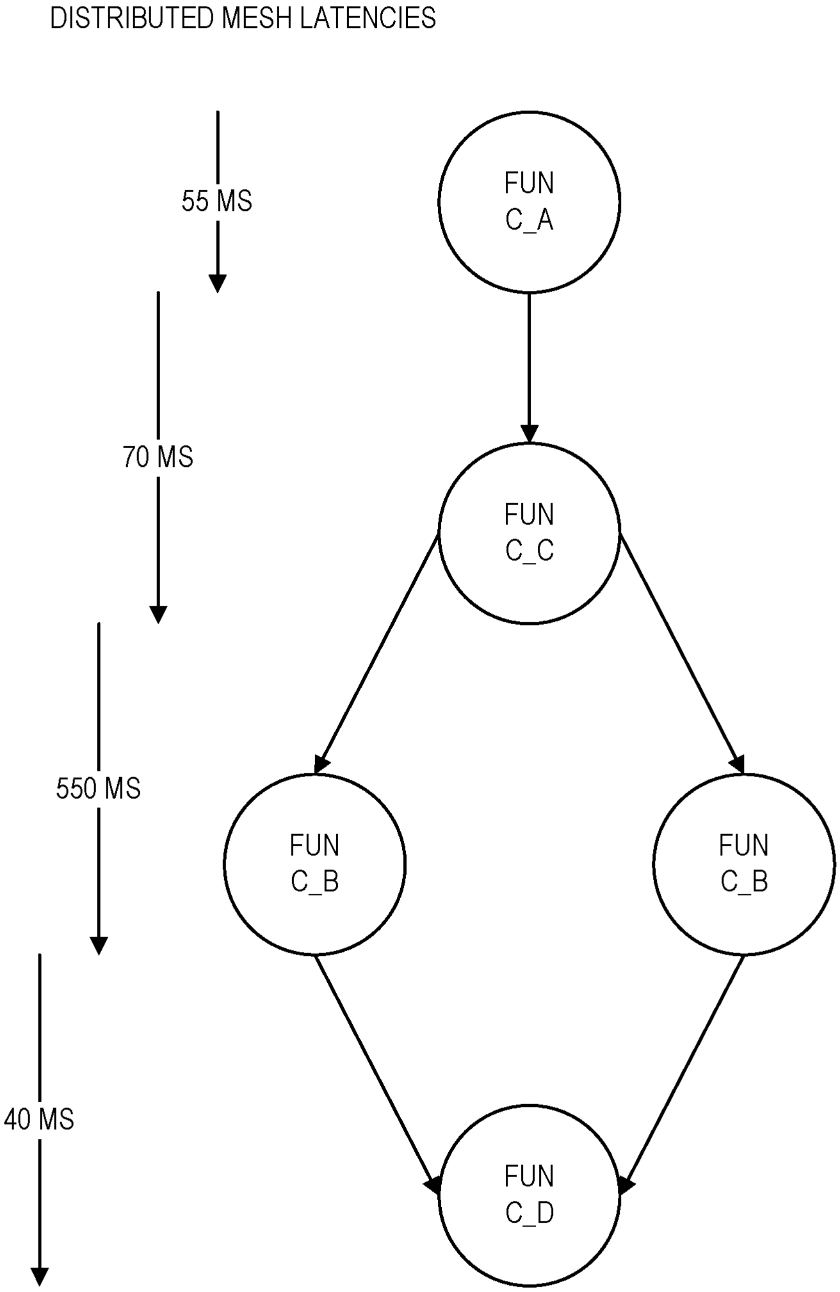
FIG. 11 depicts latencies for distributed functions, according to an example.

FIG. 11 provides a depiction of the latencies in a service mesh graph. After the switch 1010 determines a set of candidate functions or candidate function+execution node instances, the switch 1010 may be configured to load balance across the candidates, effectuating load balancing at both the node as well as the network.

To execute meshes, the switch 1010 may be configured to provide service mesh definitions (e.g., descriptions) to other switches or components involved in implementing the service mesh. In an example, the service mesh definition is a graph where vertices are functions or function and platform combinations, and edges definition relationships (e.g., dependencies) between the functions.

In an example, the switch 1010 is configured to maintain an execution state of an executing service mesh. In an example, the service mesh state is stored and maintained in the pooled memory 1025. In an example, the service mesh state may be moved or copied to a second pooled memory, or other storage facility. In an example, the location of the service mesh state is located closer to execution of the service components of the service mesh. Here, closer generally means fewer network hops, or lower latency network connectivity than a farther location.

In an example, in response to a service request, the switch 1010 is configured to allocate the local resources to process the service request. The switch 1010 may be configured to create a mesh tracker with all of the functions to be executed including the latencies incurred during execution. In an example, the switch 1010 is configured to create the resources in the memory pool to maintain the data passed into or between service components or to maintain other aspects of the service mesh state. The switch 1010 may also be configured to propagate temporary data across various execution nodes or function providers as well as telemetry data consumed by the tenant.

The switch 1010 is configured to begin execution (e.g., invoke function performance on the execution node 1030) of the service mesh.

IPUs are natural hosting sites for running networking microkernels both outside the host OS (e.g., Google Snap model) and for running them as freestanding sandboxes with hardware privilege, for example, such that the executive processor at an IPU runs on independent hardware, even if a host machine is compromised and fails to provide hardware or software support to the IPU. In an example, a chain of IPUs, each IPU at a different host node, may be used to form an IPU trusted enclave (e.g., using a trusted execution environment (TEE)). As a network and inter-CPU intermediary in each host, the IPU TEE effectively bridges the TEEs at each of the various hardware compute perimeters. This provides for a form of disaggregation for confidential computing resources to be combined together into dynamic compositions without dependence on host based services.

Systems being monitored from security or integrity perspectives generally use a centralized component to analyze a large amount of data (e.g., trusted platform management (TPM) quotes per building block) and comparing these to reference images. At scale, starting with a few thousand devices that are continuously transmitting data the device management infrastructure implementing remote attestation, difficulties in processing this data may occur. Often, these central components are cloud based, resulting in a failure to perform integrity checking if there is a connectivity issue between a facility and the cloud. To address these issues, The IPU may be configured to attest the integrity of all the nodes under a local infrastructure, without considering connectivity to the cloud. The IPU is secured as much as possible to become a trusted device and so the trust of the entire local network can rely on the IPU. This also provides simplicity to manage/monitor the system from a central location, because a simple inquiry the IPU is used.

FIG. 11 depicts latencies for distributed functions, according to an example. Specifically, the latency for the execution of CNFunction A (C_A) is 55 milliseconds (ms). The 70 ms latency for CNFunction C (C_C) includes both the network latency as well as the execution latency. The total latency of the illustrated service mesh is 715 ms.

Figure 12:
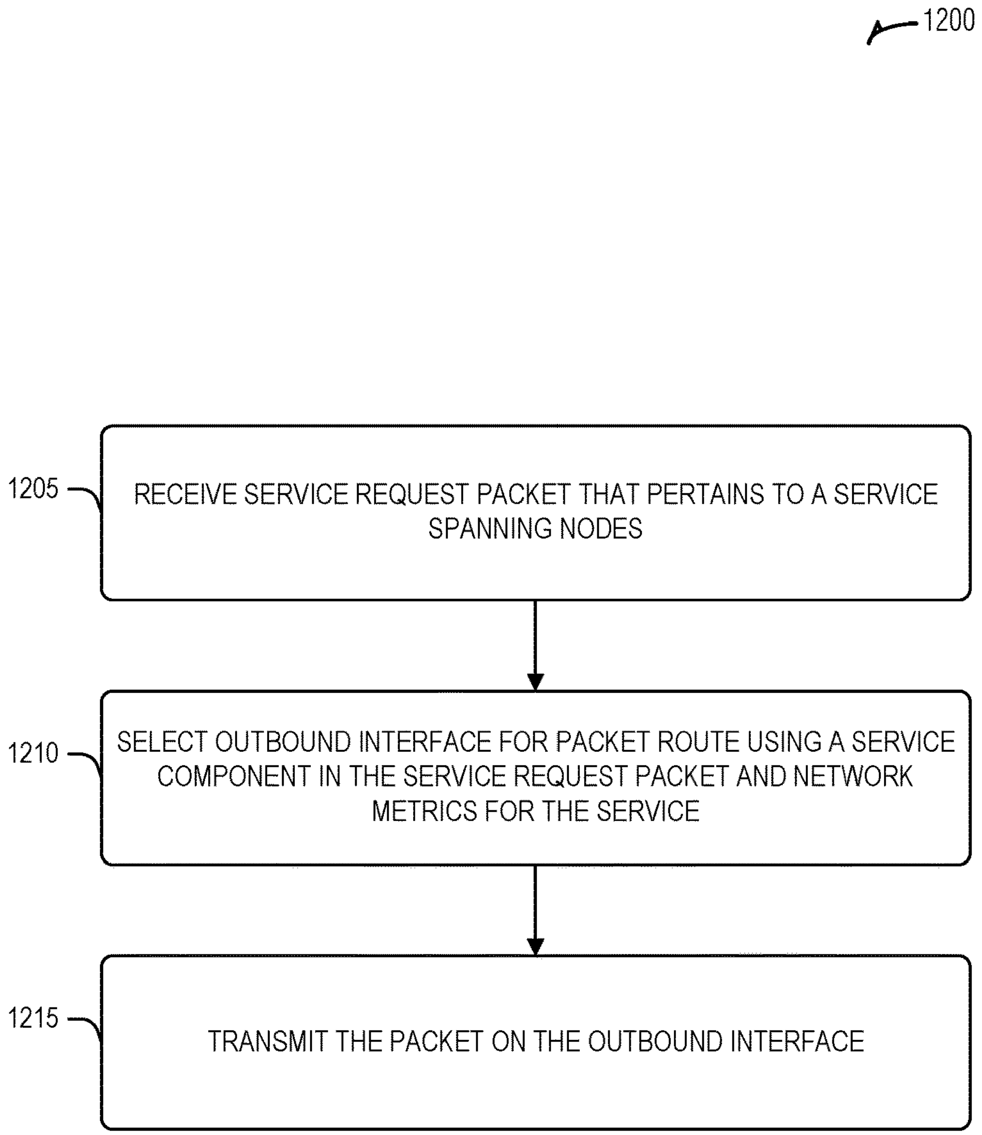
FIG. 12 depicts a method for service mesh switching, according to an example.

FIG. 12 depicts a method 1200 for service mesh switching, according to an example. The operations of the method 1200 are performed by hardware, such as that described above (e.g., circuitry, an IPU, etc.).

At operation 1205, a packet is received at a networking infrastructure device. This packet includes a service request for a service. In an example, the service includes an application that spans multiple nodes in a network to which the networking infrastructure device belongs. In an example, the networking infrastructure device is an IPU—such as the IPU 610 illustrated in FIG. 6—included in a node of the network, such as the cloud 130 or the edge cloud 110 illustrated in FIG. 1. In an example, the networking infrastructure device is included in a switch of the network, such as the switch 910 illustrated in FIG. 9.

In an example, the network is a named function network (NFN), similar to that illustrated in FIG. 8. In an example, the service component is a name for a named function. In an example, the application includes multiple named functions.

At operation 1210, an outbound interface of the networking infrastructure device is selected through which to route the packet. In this case, the networking infrastructure device includes multiple outbound interfaces. The selection of the outbound interface among the other outbound interfaces is based on a service component of the service request in the packet and network metrics that correspond to the service. In an example, the networking infrastructure device includes a service registry. In an example, the service has a corresponding entry in the service registry. In an example, at least a portion of the network metrics that correspond to the service are stored in the corresponding entry of the service registry.

In an example, the networking infrastructure device implements an ICN. In an example, the networking infrastructure device includes a forward information base (FIB) to match the name for the named function and the outbound interface. In an example, the FIB includes the network metrics that correspond to names that are part of the service. In an example, a second outbound interface matches the name for the named function. In an example, the outbound interface is selected based on network metrics for the outbound interface indicating greater performance of the service than network metrics for the second outbound interface.

In an example, the method 1200 includes additional operations, including receiving a portion of the network metrics from a second switch. In this example, the portion of the network metrics received from the second switch relate to nodes directly connected to the second switch.

At operation 1215, the packet is transmitted using the outbound interface.

USE CASES AND ADDITIONAL EXAMPLES

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 is a networking infrastructure device for service mesh switching, the networking infrastructure device comprising: multiple network interfaces; and processing circuitry that, when in operation, is configured to: receive, via an in-bound interface of the multiple network interface, a packet that includes a service request for a service, the service including an application that spans multiple nodes in a network to which the networking infrastructure device belongs; select, from the multiple network interfaces, an outbound interface of the networking infrastructure device through which to route the packet, the multiple network interfaces including multiple outbound interfaces, for the packet based on: a service component of the service request in the packet; and network metrics that correspond to the service; and transmit the packet using the outbound interface.

In Example 2, the subject matter of Example 1, wherein the networking infrastructure device includes a service registry, wherein the service has a corresponding entry in the service registry, and wherein at least a portion of the network metrics that correspond to the service are stored in the corresponding entry.

In Example 3, the subject matter of any of Examples 1-2, wherein the network is a named function network (NFN).

In Example 4, the subject matter of Example 3, wherein the service component is a name for a named function, and wherein the application includes multiple named functions.

In Example 5, the subject matter of any of Examples 3-4, wherein the networking infrastructure device implements information centric networking (ICN), and wherein the networking infrastructure device includes a forward information base (FIB) to match the name for the named function and the outbound interface.

In Example 6, the subject matter of Example 5, wherein the FIB includes the network metrics that correspond to names that are part of the service.

In Example 7, the subject matter of Example 6, wherein a second outbound interface matches the name for the named function, and wherein the outbound interface is selected based on network metrics for the outbound interface indicating greater performance of the service than network metrics for the second outbound interface.

In Example 8, the subject matter of any of Examples 1-7, wherein the networking infrastructure device is a network processing unit included in a node of the network.

In Example 9, the subject matter of any of Examples 1-8, wherein the networking infrastructure device is included in a switch of the network.

In Example 10, the subject matter of Example 9, wherein the processing circuitry is configured to receive a portion of the network metrics from a second switch, the portion of the network metrics relating to nodes directly connected to the second switch.

Example 11 is a method for service mesh switching, the method comprising: receiving, at a networking infrastructure device, a packet that includes a service request for a service, the service including an application that spans multiple nodes in a network to which the networking infrastructure device belongs; selecting an outbound interface of the networking infrastructure device through which to route the packet, the networking infrastructure device including multiple outbound interfaces, for the packet based on: a service component of the service request in the packet; and network metrics that correspond to the service; and transmitting the packet using the outbound interface.

In Example 12, the subject matter of Example 11, wherein the networking infrastructure device includes a service registry, wherein the service has a corresponding entry in the service registry, and wherein at least a portion of the network metrics that correspond to the service are stored in the corresponding entry.

In Example 13, the subject matter of any of Examples 11-12, wherein the network is a named function network (NFN).

In Example 14, the subject matter of Example 13, wherein the service component is a name for a named function, and wherein the application includes multiple named functions.

In Example 15, the subject matter of any of Examples 13-14, wherein the networking infrastructure device implements information centric networking (ICN), and wherein the networking infrastructure device includes a forward information base (FIB) to match the name for the named function and the outbound interface.

In Example 16, the subject matter of Example 15, wherein the FIB includes the network metrics that correspond to names that are part of the service.

In Example 17, the subject matter of Example 16, wherein a second outbound interface matches the name for the named function, and wherein the outbound interface is selected based on network metrics for the outbound interface indicating greater performance of the service than network metrics for the second outbound interface.

In Example 18, the subject matter of any of Examples 11-17, wherein the networking infrastructure device is a network processing unit included in a node of the network.

In Example 19, the subject matter of any of Examples 11-18, wherein the networking infrastructure device is included in a switch of the network.

In Example 20, the subject matter of Example 19, comprising receiving a portion of the network metrics from a second switch, the portion of the network metrics relating to nodes directly connected to the second switch.

Example 21 is at least one machine readable medium including instructions for service mesh switching, the instructions, when executed by processing circuitry, cause the processing circuitry to perform operations comprising: receiving, at a networking infrastructure device, a packet that includes a service request for a service, the service including an application that spans multiple nodes in a network to which the networking infrastructure device belongs; selecting an outbound interface of the networking infrastructure device through which to route the packet, the networking infrastructure device including multiple outbound interfaces, for the packet based on: a service component of the service request in the packet; and network metrics that correspond to the service; and transmitting the packet using the outbound interface.

In Example 22, the subject matter of Example 21, wherein the networking infrastructure device includes a service registry, wherein the service has a corresponding entry in the service registry, and wherein at least a portion of the network metrics that correspond to the service are stored in the corresponding entry.

In Example 23, the subject matter of any of Examples 21-22, wherein the network is a named function network (NFN).

In Example 24, the subject matter of Example 23, wherein the service component is a name for a named function, and wherein the application includes multiple named functions.

In Example 25, the subject matter of any of Examples 23-24, wherein the networking infrastructure device implements information centric networking (ICN), and wherein the networking infrastructure device includes a forward information base (FIB) to match the name for the named function and the outbound interface.

In Example 26, the subject matter of Example 25, wherein the FIB includes the network metrics that correspond to names that are part of the service.

In Example 27, the subject matter of Example 26, wherein a second outbound interface matches the name for the named function, and wherein the outbound interface is selected based on network metrics for the outbound interface indicating greater performance of the service than network metrics for the second outbound interface.

In Example 28, the subject matter of any of Examples 21-27, wherein the networking infrastructure device is a network processing unit included in a node of the network.

In Example 29, the subject matter of any of Examples 21-28, wherein the networking infrastructure device is included in a switch of the network.

In Example 30, the subject matter of Example 29, wherein the operations include receiving a portion of the network metrics from a second switch, the portion of the network metrics relating to nodes directly connected to the second switch.

Example 31 is a system for service mesh switching, the system comprising: means for receiving, at a networking infrastructure device, a packet that includes a service request for a service, the service including an application that spans multiple nodes in a network to which the networking infrastructure device belongs; means for selecting an outbound interface of the networking infrastructure device through which to route the packet, the networking infrastructure device including multiple outbound interfaces, for the packet based on: a service component of the service request in the packet; and network metrics that correspond to the service; and means for transmitting the packet using the outbound interface.

In Example 32, the subject matter of Example 31, wherein the networking infrastructure device includes a service registry, wherein the service has a corresponding entry in the service registry, and wherein at least a portion of the network metrics that correspond to the service are stored in the corresponding entry.

In Example 33, the subject matter of any of Examples 31-32, wherein the network is a named function network (NFN).

In Example 34, the subject matter of Example 33, wherein the service component is a name for a named function, and wherein the application includes multiple named functions.

In Example 35, the subject matter of any of Examples 33-34, wherein the networking infrastructure device implements information centric networking (ICN), and wherein the networking infrastructure device includes a forward information base (FIB) to match the name for the named function and the outbound interface.

In Example 36, the subject matter of Example 35, wherein the FIB includes the network metrics that correspond to names that are part of the service.

In Example 37, the subject matter of Example 36, wherein a second outbound interface matches the name for the named function, and wherein the outbound interface is selected based on network metrics for the outbound interface indicating greater performance of the service than network metrics for the second outbound interface.

In Example 38, the subject matter of any of Examples 31-37, wherein the networking infrastructure device is a network processing unit included in a node of the network.

In Example 39, the subject matter of any of Examples 31-38, wherein the networking infrastructure device is included in a switch of the network.

In Example 40, the subject matter of Example 39, comprising means for receiving a portion of the network metrics from a second switch, the portion of the network metrics relating to nodes directly connected to the second switch.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

Although these implementations have been described concerning specific exemplary aspects, it will be evident that various modifications and changes may be made to these aspects without departing from the broader scope of the present disclosure. Many of the arrangements and processes described herein can be used in combination or in parallel implementations that involve terrestrial network connectivity (where available) to increase network bandwidth/throughput and to support additional edge services. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is disclosed. Thus, although specific aspects have been illustrated and described herein, it should be appreciated that any arrangement calculated to achieve the same purpose may be substituted for the specific aspects shown. This disclosure is intended to cover any adaptations or variations of various aspects. Combinations of the above aspects and other aspects not specifically described herein will be apparent to those of skill in the art upon reviewing the above description.

What is claimed is:

1. A networking infrastructure device for service mesh switching, the networking infrastructure device comprising:

multiple network interfaces; and processing circuitry that, when in operation, is configured to:

receive, via an in-bound interface of the multiple network interfaces, a packet that includes a function request for an application of a service, the application implemented on a mesh of multiple nodes in a network to which the networking infrastructure device belongs;

select, from the multiple network interfaces, an outbound interface of the networking infrastructure device through which to route the packet, the multiple network interfaces including multiple outbound interfaces, for the packet based on:

a component of the function request in the packet; and network metrics that correspond to the service, the network metrics enabling a selection of the outbound interface to balance a load, for the application across the multiple nodes of the mesh, for function calls corresponding to the function request; and transmit the packet using the outbound interface.

2. The networking infrastructure device of claim 1, wherein the networking infrastructure device includes a service registry, wherein the service has a corresponding entry in the service registry, and wherein at least a portion of the network metrics that correspond to the service are stored in the corresponding entry.

3. The networking infrastructure device of claim 1, wherein the network is a named function network (NFN).

4. The networking infrastructure device of claim 3, wherein the component is a name for a named function, and wherein the application includes multiple named functions.

5. The networking infrastructure device of claim 3, wherein the networking infrastructure device implements information centric networking (ICN), and wherein the networking infrastructure device includes a forward information base (FIB) to match the name for the named function and the outbound interface.

6. The networking infrastructure device of claim 5, wherein the FIB includes the network metrics that correspond to names that are part of the service.

7. The networking infrastructure device of claim 6, wherein a second outbound interface matches the name for the named function, and wherein the outbound interface is selected based on network metrics for the outbound interface indicating greater performance of the service than network metrics for the second outbound interface.

8. The networking infrastructure device of claim 1, wherein the networking infrastructure device is a network processing unit included in a node of the network.

9. The networking infrastructure device of claim 1, wherein the networking infrastructure device is included in a switch of the network.

10. The networking infrastructure device of claim 9, wherein the processing circuitry is configured to receive a portion of the network metrics from a second switch, the portion of the network metrics relating to nodes directly connected to the second switch.

11. At least one non-transitory machine readable medium including instructions for service mesh switching, the instructions, when executed by processing circuitry, cause the processing circuitry to perform operations comprising:

receiving, at a networking infrastructure device, a packet that includes a function request for an application of a service, the application implemented on a mesh of multiple nodes in a network to which the networking infrastructure device belongs;

selecting an outbound interface of the networking infrastructure device through which to route the packet, the networking infrastructure device including multiple outbound interfaces, for the packet based on:

a component of the function request in the packet; and network metrics that correspond to the service, the network metrics enabling a selection of the outbound interface to balance a load, for the application across the multiple nodes of the mesh, for function calls corresponding to the function request; and transmitting the packet using the outbound interface.

12. The at least one non-transitory machine readable medium of claim 11, wherein the networking infrastructure device includes a service registry, wherein the service has a corresponding entry in the service registry, and wherein at least a portion of the network metrics that correspond to the service are stored in the corresponding entry.

13. The at least one non-transitory machine readable medium of claim 11, wherein the network is a named function network (NFN).

14. The at least one non-transitory machine readable medium of claim 13, wherein the component is a name for a named function, and wherein the application includes multiple named functions.

15. The at least one non-transitory machine readable medium of claim 13, wherein the networking infrastructure device implements information centric networking (ICN), and wherein the networking infrastructure device includes a forward information base (FIB) to match the name for the named function and the outbound interface.

16. The at least one non-transitory machine readable medium of claim 15, wherein the FIB includes the network metrics that correspond to names that are part of the service.

17. The at least one non-transitory machine readable medium of claim 16, wherein a second outbound interface matches the name for the named function, and wherein the outbound interface is selected based on network metrics for the outbound interface indicating greater performance of the service than network metrics for the second outbound interface.

18. The at least one non-transitory machine readable medium of claim 11, wherein the networking infrastructure device is a network processing unit included in a node of the network.

19. The at least one non-transitory machine readable medium of claim 11, wherein the networking infrastructure device is included in a switch of the network.

20. The at least one non-transitory machine readable medium of claim 19, wherein the operations include receiving a portion of the network metrics from a second switch, the portion of the network metrics relating to nodes directly connected to the second switch.

21. A system for service mesh switching, the system comprising:

means for receiving, at a networking infrastructure device, a packet that includes a function request for an application of a service, the application implemented on a mesh of multiple nodes in a network to which the networking infrastructure device belongs;

means for selecting an outbound interface of the networking infrastructure device through which to route the packet, the networking infrastructure device including multiple outbound interfaces, for the packet based on:
a component of the function request in the packet; and
network metrics that correspond to the service, the network metrics enabling a selection of the outbound interface to balance a load, for the application across the multiple nodes of the mesh, for function calls corresponding to the function request; and means for transmitting the packet using the outbound interface.

22. The system of claim 21, wherein the networking infrastructure device includes a service registry, wherein the service has a corresponding entry in the service registry, and wherein at least a portion of the network metrics that correspond to the service are stored in the corresponding entry.

23. The system of claim 21, wherein the network is a named function network (NFN).

24. The system of claim 23, wherein the service component is a name for a named function, and wherein the application includes multiple named functions.

25. The system of claim 23, wherein the networking infrastructure device implements information centric networking (ICN), and wherein the networking infrastructure device includes a forward information base (FIB) to match the name for the named function and the outbound interface.

* * * * *